United States Patent [19]

Murakami

[11] Patent Number: 4,852,950

[45] Date of Patent: Aug. 1, 1989

[54] VEHICLE BRAKING SYSTEM CAPABLE OF PREVENTING ROCK-BACK MOTION OF DRIVER/PASSENGER UPON VEHICLE STOPPING

[75] Inventor: Zensaku Murakami, Susono, Japan

[73] Assignee: Toyota Jidosha Kabushiki Kaisha, Aichi, Japan

[21] Appl. No.: 242,915

[22] Filed: Sep. 12, 1988

[30] Foreign Application Priority Data

Sep. 16, 1987 [JP] Japan .................. 62-231586
Dec. 17, 1987 [JP] Japan .................. 62-319691
Dec. 18, 1987 [JP] Japan .................. 62-322243
Apr. 21, 1988 [JP] Japan ............. 63-53959[U]

[51] Int. Cl.⁴ .................. B60K 41/20; B60T 8/24
[52] U.S. Cl. .................. 303/100; 180/197; 192/1.23; 364/426.02
[58] Field of Search .................. 60/545; 180/197; 303/100, 103, 106, 110, 111; 364/426.02, 426.03; 192/1.21, 1.22, 1.23, 1.24, 1.32

[56] References Cited

U.S. PATENT DOCUMENTS 4,733,760 3/1988 Inagaki et al. .................. 192/1.22
4,758,053 7/1988 Yasuno .................. 303/100 X

FOREIGN PATENT DOCUMENTS 129341 10/1981 Japan .
0121160 6/1985 Japan .................. 303/100
0091350 4/1987 Japan .................. 303/100

Primary Examiner—Duane A. Reger
Attorney, Agent, or Firm—Oliff & Berridge

[57] ABSTRACT

A braking system for a motor vehicle, including a wheel cylinders provided on wheels of the vehicle for braking the wheels with braking pressures corresponding to an operation of a brake operating member, a speed detector for detecting a running speed of the vehicle, a stop control device for lowering the braking pressures of the wheel cylinders when the detected vehicle speed falls below a predetermined reference value, and thereby reducing an amount of rock-back of the vehicle driver/passenger upon stopping of the vehicle, a slope determining device for determining whether a road on which the vehicle is running is a level road, an uphill or a downhill, and a device for determining a pressure-decrease pattern in which the braking pressures of the wheel cylinders are lowered by the stop control device, according to a result of the determination by the slope determining device.

17 Claims, 26 Drawing Sheets

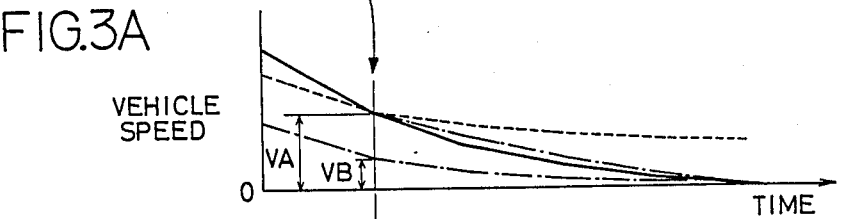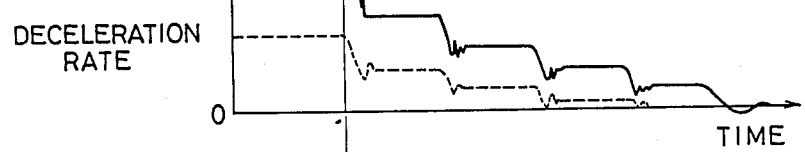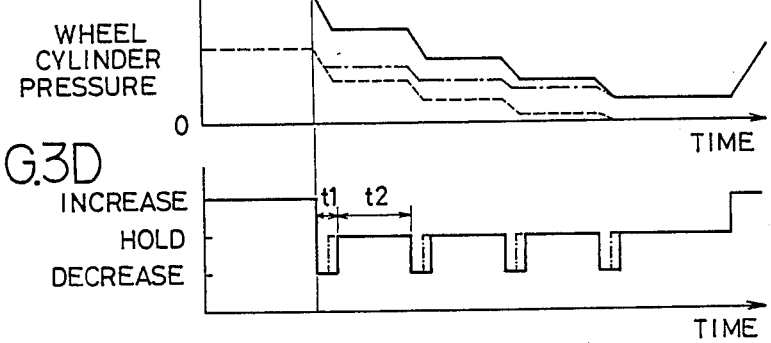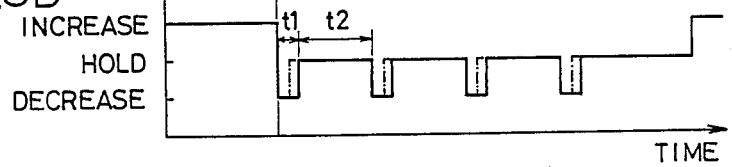

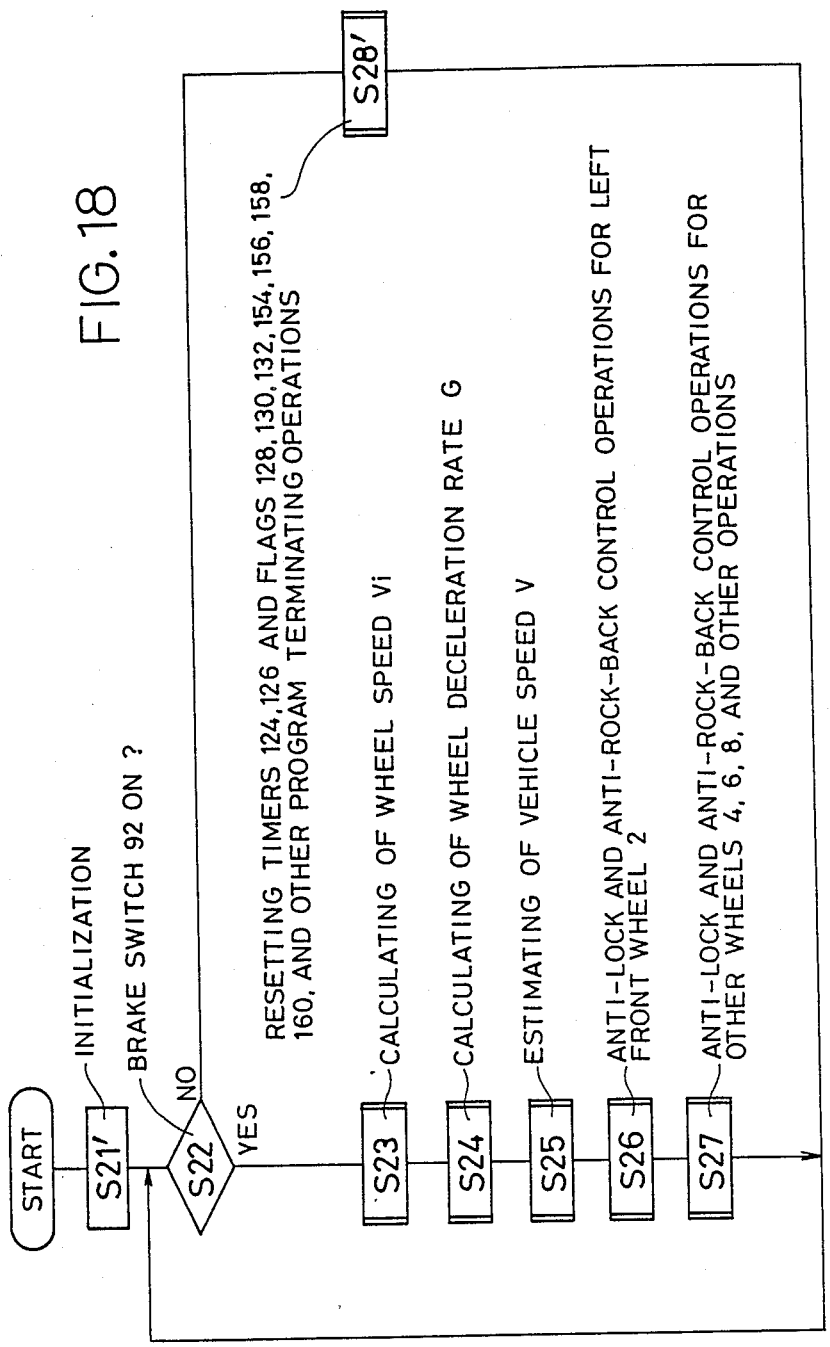

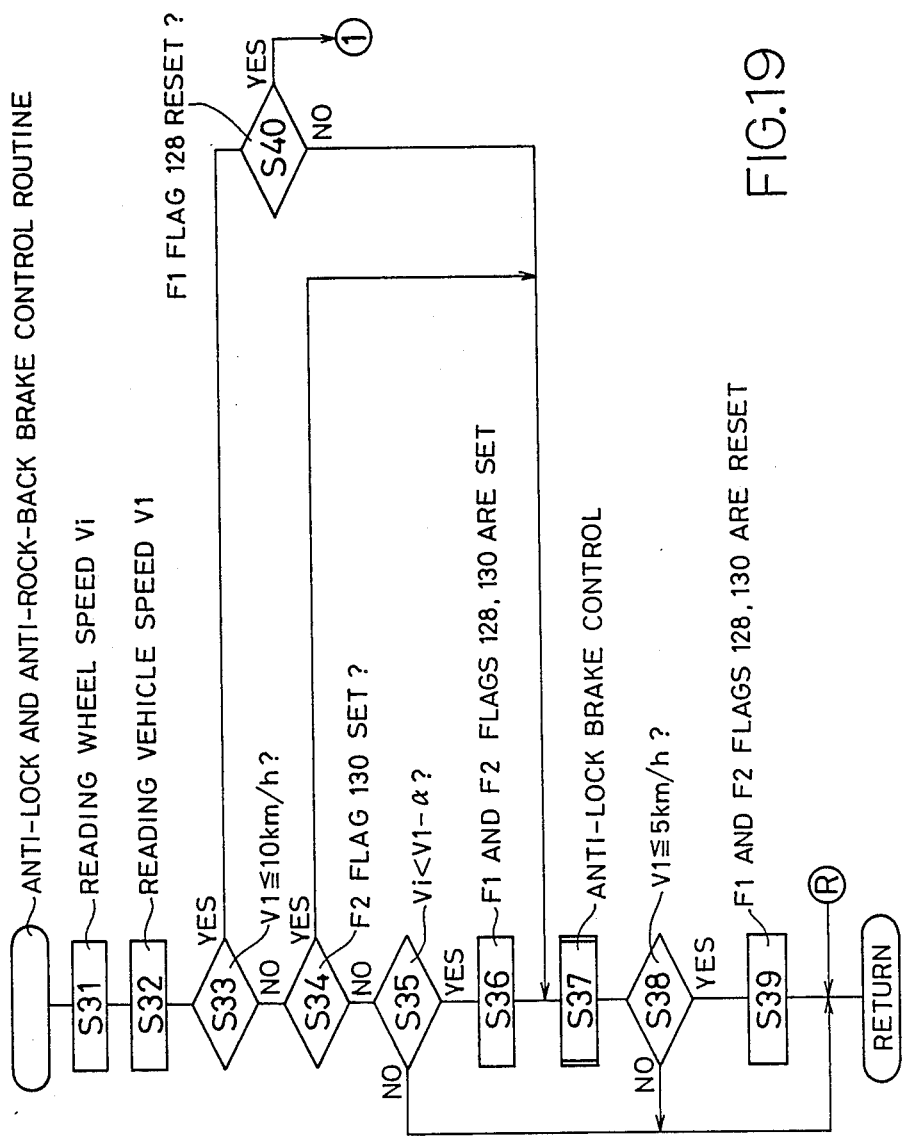

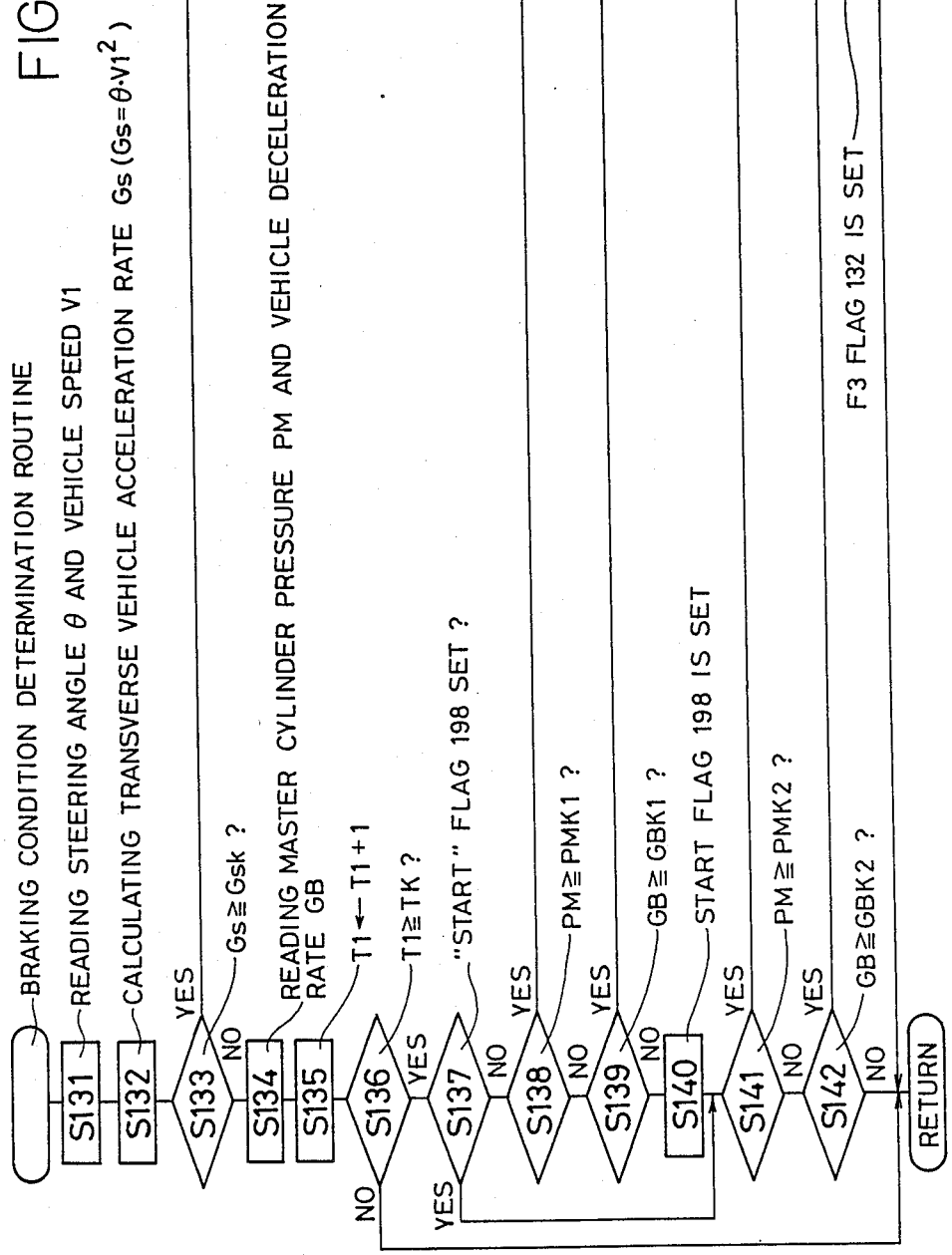

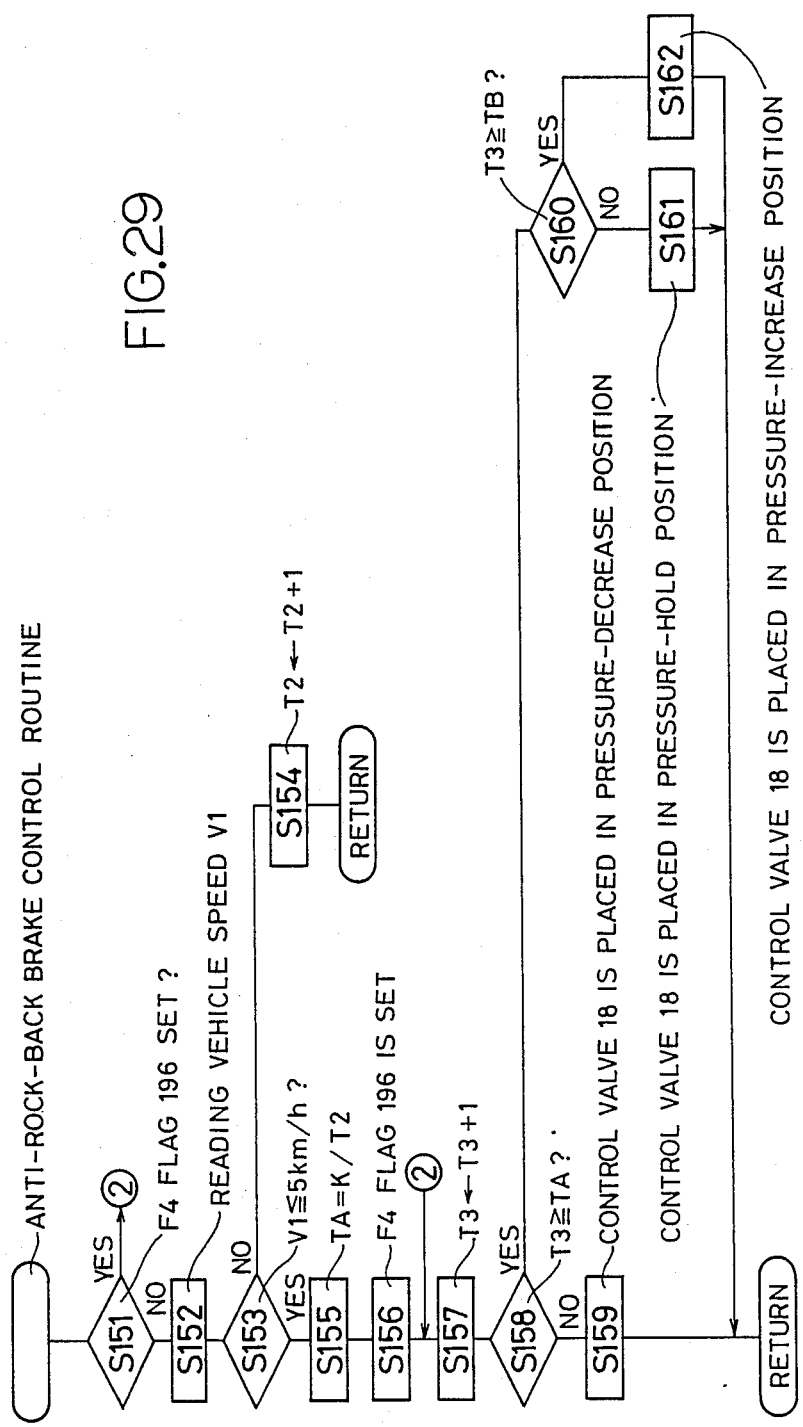

VEHICLE BRAKING SYSTEM CAPABLE OF PREVENTING ROCK-BACK MOTION OF DRIVER/PASSENGER UPON VEHICLE STOPPING

BACKGROUND OF THE INVENTION

1. Field of the Invention

The present invention relates generally to a braking system for a motor vehicle, and more particularly to improvements in an anti-rock-back device incorporated in the braking system, for preventing or minimizing a rock-back motion of the vehicle driver/passengers which occur when the vehicle is stopped with brake applied.

2. Discussion of the Prior Art

A motor vehicle is brought to a stop by keeping a brake pedal depressed. When the vehicle is stopped, the vehicle driver and passengers are subject to an uncomfortable backward motion (hereinafter referred to as "rock-back motion"). When the vehicle is stopped, the running speed of the vehicle (hereinafter referred to as "vehicle speed") is lowered and eventually zeroed. The rock-back motion takes place due to sudden zeroing of the deceleration rate (negative acceleration rate) of the vehicle from a given value. To assure a comfortable stop of the vehicle without the rock-back motion, the vehicle driver is required to exercise an utmost in manipulating the brake pedal, particularly at a terminal portion of the braking operation immediately before the vehicle is brought to a complete stop. This manipulation of the brake pedal is difficult for an unskilled vehicle driver, and is not easy even for a skilled driver.

There is known a braking system which has a function of gradually or slowing lowering the vehicle deceleration rate to zero, during application of a braking pressure to the wheel cylinders of the vehicle, so that the amount of the rock-back motion of the driver and passengers upon stopping of the vehicle is minimized.

An example of such a braking system having an anti-rock-back arrangement is disclosed in laid-open publication No. 56-129341 of Japanese unexamined Utility Model Application. In this braking system, a rod for transmitting an operating force of a brake pedal to a master cylinder piston is connected to the brake pedal by means of a link mechanism which is provided with a solenoid. When the brake pedal is depressed, the rod is advanced with the brake pedal, thereby producing a braking pressure. Immediately before the vehicle speed is zeroed, the solenoid is energized to activate the link mechanism, so as to permit a movement of the rod relative to the brake pedal. Thus, the rod may be retracted while the brake pedal remains at the operated position, and the brake is automatically released.

Since the brake is released immediately before the vehicle speed is zeroed, the amount of the rock-back motion upon stopping of the vehicle may be reduced, as if the driver intentionally reduces an operating force on the brake pedal at a terminal portion of the brake application.

The fact that the link mechanism permits the rod to be retracted means that the link mechanism also permits the brake pedal to be advanced in the operating direction. Accordingly, the brake pedal is suddenly depressed a further distance upon stopping of the vehicle, which causes the vehicle driver's foot to be unexpectedly moved. This is also uncomfortable to the driver.

To sufficiently reduce the amount of the rock-back motion of the vehicle driver and passenger, it is desirable that the wheel cylinder pressure be smoothly or slowly lowered. However, the above proposed arrangement suffers from a sudden drop of the wheel cylinder pressure, and is not sufficiently capable of preventing the rock-back motion.

In view of the above drawbacks in minimizing the rock-back motion upon stopping of the vehicle by brake application, it is considered to lower the braking pressure in the wheel cylinder in a controlled fashion, a suitable time before the vehicle is completely stopped.

If the anti-rock-back brake control operation by lowering the wheel cylinder pressure is performed uniformly in a predetermined manner in different conditions of the road on which the vehicle is running, the vehicle may not be stopped with a suitable braking distance, or the rock-back motion of the driver and passengers may not be sufficiently reduced. More specifically, if the anti-lock-back lowering of the wheel cylinder pressure is effected on an uphill or downhill road, in the same manner as practiced on a level road, the braking distance may be unnecessarily increased, or the amount of pressure decrease may not be sufficient, with a result of an insufficient anti-rock-back effect.

Further, if the anti-rock-back brake control operation is effected uniformly irrespective of the deceleration rate of the vehicle prior to starting the anti-rock-back brake control operation, the required braking distance or the anti-rock-back effect may be fluctuated. In this respect, it is noted that the deceleration rate of the vehicle at a given point of time during the brake application is almost proportional with the wheel cylinder pressure at that point of time, provided the road surface condition is constant. Accordingly, the braking distance and the anti-rock-back effect obtained may vary depending upon the wheel cylinder pressure at which the anti-rock-back brake control operation is started.

It is considered that the anti-rock-back brake control operation may be achieved by utilizing an anti-lock braking arrangement of the braking system, which includes a solenoid-operated pressure control valve device adapted to achieve an anti-lock operation to prevent an excessive amount of slip of the wheels of the vehicle during brake application by a hydraulically operated brake device. The pressure control valve device is operable between a pressure-increase position for feeding a brake fluid into the wheel cylinders to increase the braking pressures, and pressure-decrease position for discharging the brake fluid from the wheel cylinders to decrease the braking pressures. If this pressure control valve device is switched to the pressure-decrease position when the vehicle speed is lowered down to a predetermined reference value during normal brake application, the wheel cylinder pressures may be lowered so as to reduce an amount of a rock-back motion of the vehicle driver and passengers upon stopping of the vehicle. During the anti-lock braking operation, the solenoid-operated pressure control valve is required to permit a considerably high rate of a discharge flow of the fluid from the wheel cylinder in order to prevent or reduce an amount of slip of the appropriate wheel. During the anti-rock-back braking operation, on the other hand, the pressure control valve is required to permit a relatively restricted flow of the fluid from the wheel cylinder, so that the wheel cylinder pressure is slowly lowered to prevent or minimize the rock-back motion of the driver and passengers. Therefore, the same pressure control valve device cannot serve satisfactorily for both of the anti-lock and anti-rock-back brake control operations.

It is considered that the solenoid-operated pressure control valve further has a pressure-hold position for maintaining the wheel cylinder pressure. In this case, the anti-rock-back brake control operation may be achieved by switching the pressure control valve alternately between the pressure-decrease and pressure-hold positions, so that the wheel cylinder pressure may be slowly lowered. In this case, however, the wheel cylinder suffers from pressure pulsation due to the alternate switching of the pressure control valve, which causes vibrations and noise of the vehicle.

The above drawbacks are experienced where the anti-rock-back brake control operation is performed by utilizing a solenoid-operated pressure control valve device which is used for effecting a traction control operation to prevent an excessive amount of slip of the drive wheels during acceleration of the vehicle, or for effecting a braking effect control operation to provide a braking effect which is predetermined depending upon an operation of the brake pedal.

An anti-rock-back brake control operation as discussed above is generally desirable for the reason also discussed above, also, however, when a brake is applied for any emergency purpose, for example, to avoid a collision of the vehicle with a pedestrian or another vehicle, or to prevent a wheel or wheels of the vehicle from moving out of a road. In this case, the vehicle should be stopped in a time period as short as possible. Therefore, the anti-rock-back brake control operation should be avoided during the emergency brake application, in order to stop the vehicle with a short braking distance.

SUMMARY OF THE INVENTION

It is therefore a first object of the present invention to provide a braking system for a motor vehicle, which is capable of producing a sufficient anti-rock-back effect upon stopping of the vehicle by brake application, with a predetermined braking distance, irrespective of the gradient of the road on which the vehicle runs.

This first object may be achieved according to the principle of the present invention, which provides a braking system for a motor vehicle, comprising: a hydraulically operated brake device having a brake operating member, and wheel cylinders provided on wheels of the vehicle for braking the wheels with braking pressures corresponding to an operation of the brake operating member; vehicle speed detecting means for detecting a running speed of the vehicle; stop control means for effecting an anti-rock-back operation of lowering the braking pressures of the wheel cylinders when the detected running speed of the vehicle falls below a predetermined reference value, and thereby reducing an amount of rock-back of a driver and/or a passenger of the vehicle upon stopping of the vehicle; slope determining means for effecting determination as to whether a road on which the vehicle is running is a level road, an uphill or a downhill; and pressure-decrease pattern determining means for determining a pressure-decrease pattern in which the braking pressures of the wheel cylinders are lowered by the stop control means, according to a result of the determination by the slope determining means.

In the braking system of the present invention constructed as described above, the anti-rock-back brake control operation is effected suitably depending upon whether the road is level, downwardly sloped or upwardly sloped. If the wheel cylinder pressure is lowered in a plurality of steps, the pressure decrease time for each step is determined depending upon the slope of the road, so that the anti-rock-back brake control operation is performed in different fashions for the level road, uphill and downhill on which the vehicle is running. Therefore, the instant braking system does not require the vehicle driver to carefully manipulate the brake operating member at a terminal portion of the brake application so as to prevent the rock-back motion of the driver/passenger. Further, the braking system according to the invention frees the vehicle driver from considering the gradient or slope of the road, to effect an optimum anti-rock-back brake control operation. Thus, the present braking system permits stopping of the vehicle by brake application, with a consistent braking distance and with a minimum amount of the rock-back motion of the driver and/or passenger, irrespective of the road on which the vehicle is running.

In one form of the above aspect of the present invention, the slope determining means includes: pressure detecting means for detecting the braking pressures of the wheel cylinders; deceleration detecting means for detecting a deceleration rate of the vehicle, without an influence by an inclination of the vehicle in a plane parallel to a running direction of the vehicle; and judging means for determining the slope of the road, by comparing the deceleration rate of the vehicle detected by the deceleration detecting means, with a predetermined deceleration rate of the vehicle which is to be established with the braking pressures of the wheel cylinders detected by the pressure detecting means, during running of the vehicle on the level road.

In another form of the braking system of the invention as described above, the slope determining means includes: first deceleration detecting means for detecting a first deceleration rate of the vehicle, without an influence by an inclination of the vehicle in a plane parallel to a running direction of the vehicle; second deceleration detecting means for detecting a second deceleration rate of the vehicle, based on an inertia produced by a freely suspended weight; and judging means for determining the slope of the road by comparing the first and second deceleration rates with each other. The first deceleration detecting means may be adapted to calculate the vehicle deceleration rate based on the detected deceleration rate of the wheels, or based on the detected amount of relative movement between the vehicle and the road surface.

In a further form of the same aspect of the invention, the stop control means includes pressure-decrease control means for lowering the braking pressures of the wheel cylinders, in a plurality of steps during the anti-rock-back operation, and the pressure-decrease pattern determining means includes decrease-time determining means for determining a time duration for which the braking pressures are lowered in each of the plurality of steps. In this case, the decrease-time determining means determines the time duration such that the time duration for the uphill road is shorter than that for the level road, while the time duration for the downhill road is longer than that for the level road.

In a still further form of the above aspect of the invention, the braking system further comprises pressure-increase means for raising the braking pressures of the wheel cylinders after the stop control means has terminated the anti-rock-back operation, and control-time determining means for determining a length of time of the anti-rock-back operation such that the length of time for the uphill road and the downhill road is shorter than that for the level road.

It is a second object of the invention to provide a braking system for a motor vehicle, which is capable of producing a consistent anti-rock-back effect, irrespective of the deceleration rate of the vehicle before the anti-rock-back operation is started.

The above object may be achieved according another aspect of the present invention, which provides a braking system for a motor vehicle, comprising: a hydraulically operated brake device having a brake operating member, and wheel cylinders provided on wheels of the vehicle for braking the wheels with braking pressures corresponding to an operation of the brake operating member; vehicle speed detecting means for detecting a running speed of the vehicle; deceleration detecting means for detecting a deceleration rate of the vehicle; pressure-decrease control means for effecting an anti-rock-back operation to lower the braking pressures of the wheel cylinders, in a plurality of steps, for a controlled time duration for each of the steps, when the detected running speed of the vehicle falls below a predetermined reference value; and decrease-time determining means for determining the controlled time duration such that the time duration decreases with a decrease in the detected deceleration of the vehicle before the anti-rock-back operation is started by the pressure-decrease control means.

In the braking system constructed according to the above aspect of the present invention, the wheel cylinder pressures are lowered in steps, for the controlled time duration in each step, when the vehicle speed falls below the predetermined level. Consequently, the wheel cylinder pressures may be slowly lowered to slowly reduce the vehicle deceleration rate to zero, so that the amount of the rock-back motion may be minimized. Further, since the pressure decrease time duration is determined such that the time duration decreases with a decrease in the detected vehicle deceleration rate prior to starting of the anti-rock-back operation, the vehicle can be stopped with a predetermined braking distance. As the vehicle deceleration rate is almost proportional with the wheel brake cylinders, shortening the pressure decrease time duration with a decrease in the wheel cylinder pressure makes it possible to avoid an excessive amount of drop of the wheel cylinder pressure, which leads to an increased braking distance.

In one form of the same aspect of the invention, the decrease-time determining means determines the controlled time duration by dividing a predetermined constant by a time period necessary for the running speed of the vehicle to be lowered to the reference value from a value which is higher than the reference value by a predetermined amount.

In another form of the same aspect of the invention, the pressure-decrease control means includes pressure-holding means for holding the braking pressures of the wheel cylinders after the braking pressures have been lowered in the plurality of steps.

The above second object may also be achieved according to a further aspect of the present invention, which provides a braking system for a motor vehicle, comprising: a hydraulically operated brake device having a brake operating member, and wheel cylinders provided on wheels of the vehicle for braking the wheels with braking pressures corresponding to an operation of the brake operating member; vehicle speed detecting means for detecting a running speed of the vehicle; deceleration detecting means for detecting a deceleration rate of the vehicle; pressure-decrease control means for effecting an anti-rock-back operation to lower the braking pressures of the wheel cylinders in a plurality of steps, when the detected running speed of the vehicle falls below a controlled reference value; and reference vehicle speed determining means for determining the controlled reference value of the running speed of the vehicle such that the reference value decreases with a decrease in the deceleration rate of the vehicle detected by the deceleration detecting means before the anti-rock-back operation is started by the pressure-decrease control means.

In the braking system constructed according to the above aspect of the present invention, the wheel cylinder pressures are lowered in steps, when the vehicle speed falls below the predetermined reference value. Since the wheel cylinder pressure is almost proportional with the vehicle deceleration rate, and the reference vehicle speed value decreases with a decrease in the vehicle deceleration rate, the anti-rock-back operation is started depending upon the vehicle deceleration rate before the anti-rock-back operation is started. For example, if the vehicle deceleration rate is relatively low, the anti-rock-back operation is started at a relatively low speed of the vehicle.

The third object of the present invention is to provide a braking system for a motor vehicle, which is capable of effecting an anti-rock-back brake control operation by utilizing a solenoid-operated pressure control valve device adapted to primarily perform at least one of an anti-lock braking operation, a traction control operation and a braking effect control operation.

The above object may be attained according to a still further aspect of the present invention, which provides a braking system for a motor vehicle, comprising: a hydraulically operated brake device having a brake operating member, and wheel cylinders provided on wheels of the vehicle for braking the wheels with braking pressures corresponding an operation of the brake operating member; vehicle speed detecting means for detecting a running speed of the vehicle; a solenoid-operated pressure control valve device adapted to achieve a primary control operation which consists of at least one of an anti-lock operation to prevent an excessive amount of slip of the wheels of the vehicle during brake application by the hydraulically operated brake device, a traction control operation to prevent an excessive amount of slip of the wheels during acceleration of the vehicle, and a braking effect control operation to provide a braking effect which is predetermined depending upon an operation of the brake operating member, the pressure control valve device being operable between a pressure-increase position for feeding a brake fluid into the wheel cylinders to increase the braking pressures, and a pressure-decrease position for discharging the brake fluid from the wheel cylinders to decrease the braking pressures; a solenoid-operated flow restrictor device disposed in a fluid passage through which the brake fluid is discharged from the wheel cylinders, with the pressure control valve device placed in the pressure-decrease position, the flow restrictor device being operable between an operated position in which a discharge flow of the brake fluid from the wheel cylinders is restricted to a value lower than that during the primary control operation of the solenoid-operated pressure control valve, and a non-operated position in which the discharge flow is not restricted; and changeover means for operating the solenoid-operated pressure control valve to the pressure-decrease position, and operating the solenoid-operated flow restrictor device to the operated position, when the detected running speed of the vehicle falls below a predetermined reference value, whereby the braking pressures of the wheel cylinders are lowered to reduce an amount of rock-back of a driver and a passenger of the vehicle upon stopping of the vehicle.

In the braking system constructed according to the above aspect of the present invention, the flow restrictor device does not restrict the flow of the brake fluid discharged from the wheel cylinder during the anti-lock braking operation, traction control operation or braking effect control operation. However, the fluid flow from the wheel cylinder is restricted while the anti-rock-back operation is performed with the pressure control valve device kept in the pressure-decrease position. Accordingly, the wheel cylinder pressure may be slowly lowered at a suitable rate, during the anti-rock-back operation, whereby the vehicle can be stopped with a suitable braking distance and with a reduced amount of the rock-back motion.

Therefore, the same solenoid-operated pressure control device may be used for the anti-rock-back brake control operation, as well as for performing its primary function such as the anti-lock braking operation, and/or traction control operation, and/or braking effect control operation. Thus, the instant arrangement contributes to reducing the cost of manufacture of the braking system, as well as eliminates the pressure pulsation of the wheel cylinders and the vehicle vibrations and noises, which would occur in the case where the solenoid-operated pressure control valve device is operated alternately between the pressure-decrease and pressure-hold positions, in order to effect the anti-rock-back operation.

It is a fourth object of the present invention to provide a braking system for a motor vehicle, which is capable of effecting an anti-rock-back brake control operation and which has suitable means for inhibiting the anti-rock-back brake control operation when an emergency brake is applied to the vehicle.

The above object may be accomplished according to a yet further aspect of the invention, which provides a braking system for a motor vehicle, comprising: a hydraulically operated brake device having a brake operating member, and wheel cylinders provided on wheels of the vehicle for braking the wheels with braking pressures corresponding an operation of the brake operating member; vehicle speed detecting means for detecting a running speed of the vehicle; stop control means for effecting an anti-rock-back operation to lower the braking pressures of the wheel cylinders when the detected running speed of the vehicle falls below a predetermined reference value, and thereby reducing an amount of rock-back of a driver and a passenger of the vehicle upon stopping of the vehicle; braking condition determining means for determining whether the hydraulically operated brake device is activated for a normal braking operation, or for an emergency braking operation; and inhibiting means for inhibiting the stop control means from operating to effect the anti-rock-back operation, if the braking condition determining means determines that the brake device has been activated for the emergency braking operation.

In the braking system constructed according to the above aspect of the invention, the anti-rock-back operation is normally effected in order to stop the vehicle without an uncomfortable rock-back motion of the vehicle driver and passenger. When an emergency brake is applied, however, the anti-rock-back operation is inhibited, so that the vehicle can be stopped with a comparatively short braking distance. Thus, the instant braking system assures driving safety as well as smooth stopping of the vehicle, without requiring a special consideration of the vehicle driver as to the distinction between an ordinary brake application and an emergency brake application.

In one form of the above aspect of the invention, the braking condition determining means determines that the brake device has been activated for the emergency braking operation, if at least one of the following parameters exceeds a corresponding reference value: an acceleration rate in a transverse direction of the vehicle during activation of the brake device; a rate of increase in the braking pressures of the wheel cylinders in an initial period of activation of the brake device; a rate of increase in a deceleration rate of the vehicle during the initial period of activation of the brake device; the braking pressures of the wheel cylinders; and the deceleration rate of the vehicle. The above parameters may be used to determine whether an emergency brake is currently applied to the vehicle, or not.

According to a yet further aspect of the present invention, there is also provided a braking system for a motor vehicle, comprising: a hydraulically operated brake device having a brake operating member, and wheel cylinders provided on wheels of the vehicle for braking the wheels with braking pressures corresponding an operation of the brake operating member; vehicle speed detecting means for detecting a running speed of the vehicle; pressure detecting means for detecting the braking pressures of the wheel cylinders; pressure-decrease control means for effecting an anti-rock-back operation to lower the braking pressures of the wheel cylinders, in a plurality of steps, for a controlled time duration for each of the plurality of steps, when the detected running speed of the vehicle falls below a predetermined reference value; and decrease-time determining means for determining the controlled time duration such that the time duration increases with an increase in the braking pressures detected by the pressure detecting means before the anti-rock-back operation is started by the pressure-decrease control means.

BRIEF DESCRIPTION OF THE DRAWINGS

The above and other objects, features and advantages of the present invention will be better understood by reading the following detailed description of presently preferred embodiments of the invention, when considered in connection with the accompanying drawings, in which:

FIG. 3 is an illustration explaining an example of an anti-rock-back operation performed by the braking device of FIG. 1 under the control of the control arrangement of FIG. 2;

FIGS. 18, 19, and 20A and 20B are flow charts illustrating control programs stored in a read-only memory of the computer used in the control arrangement of FIG. 17;

FIGS. 26–29 are flow charts illustrating control programs executed by the control arrangement of FIG. 25.

DETAILED DESCRIPTION OF THE PREFERRED EMBODIMENTS

Figure 1:
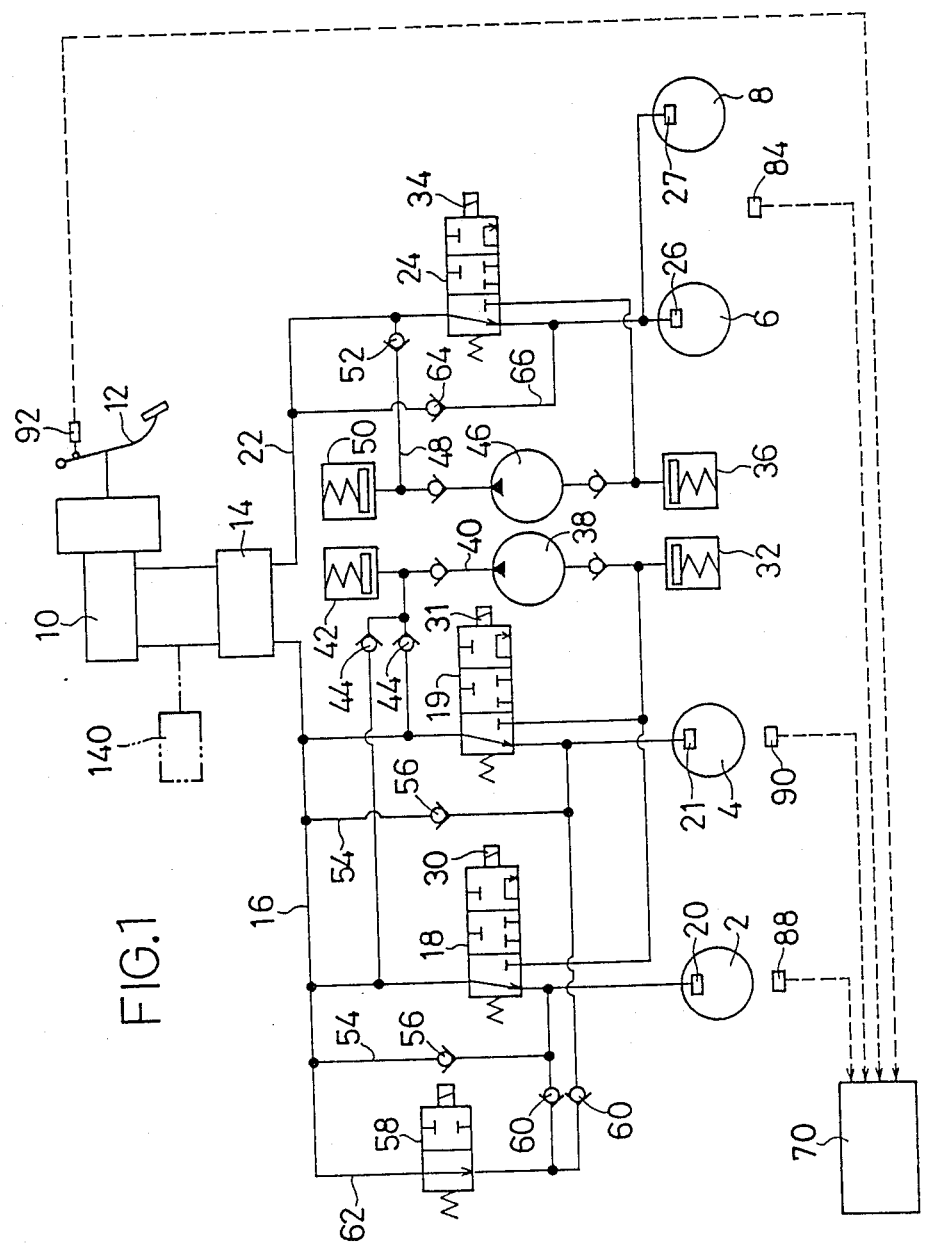
FIG. 1 is a hydraulic circuit diagram showing one embodiment of a hydraulically operated braking system for a motor vehicle of the present invention.
Figure 2:
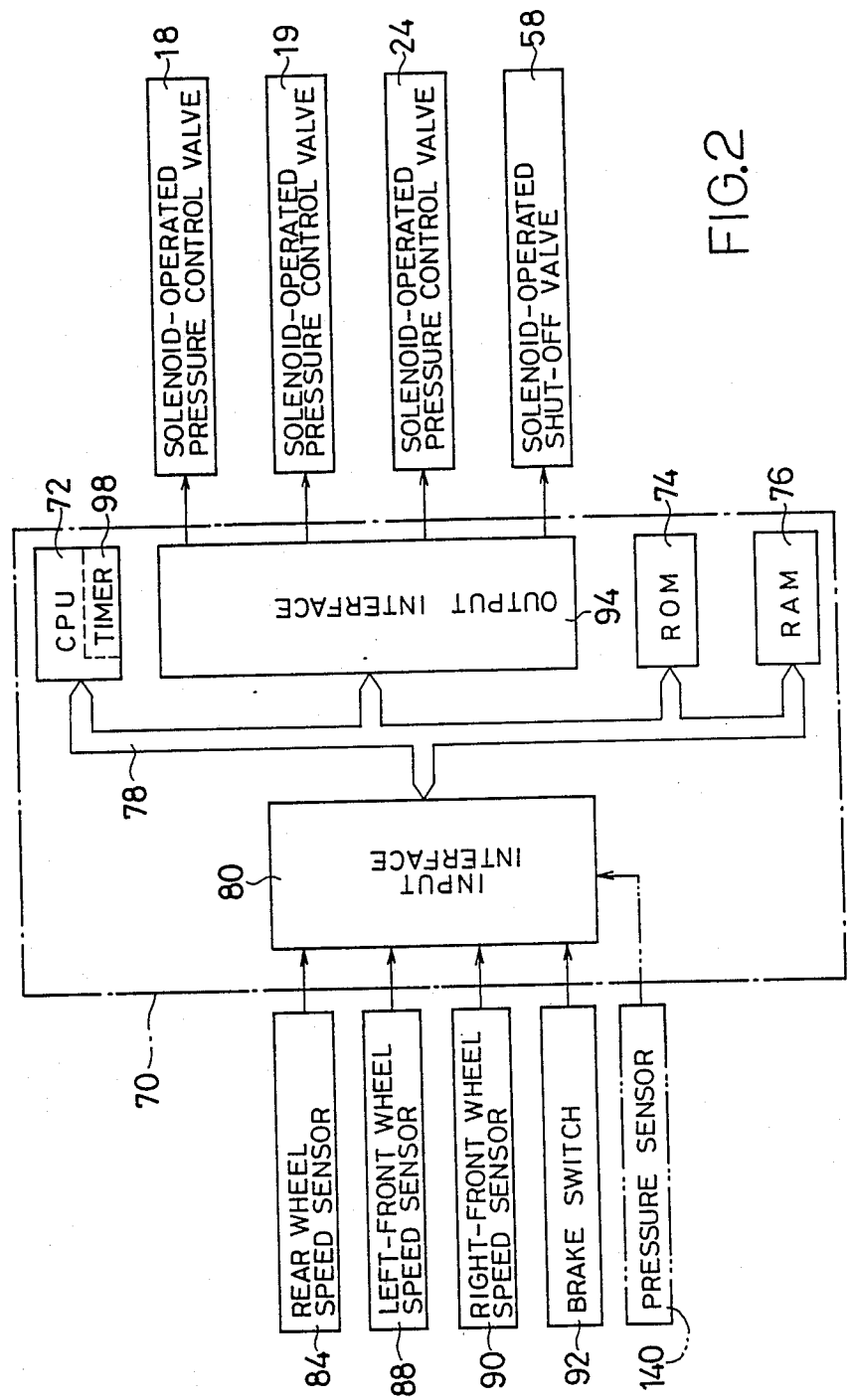
FIG. 2 is a block diagram showing a control arrangement for the braking system of FIG. 1.

Referring to FIGS. 1 and 2, there is shown the anti-lock (anti-skid) braking system for front-engine, rear-drive motor vehicle having a left front wheel 2, a right front wheel 4, a left rear wheel 6 and a right rear wheel 8. The braking system consists of a hydraulically operated brake device of FIG. 1, and an electronic anti-lock control arrangement of FIG. 2.

Figure 10:
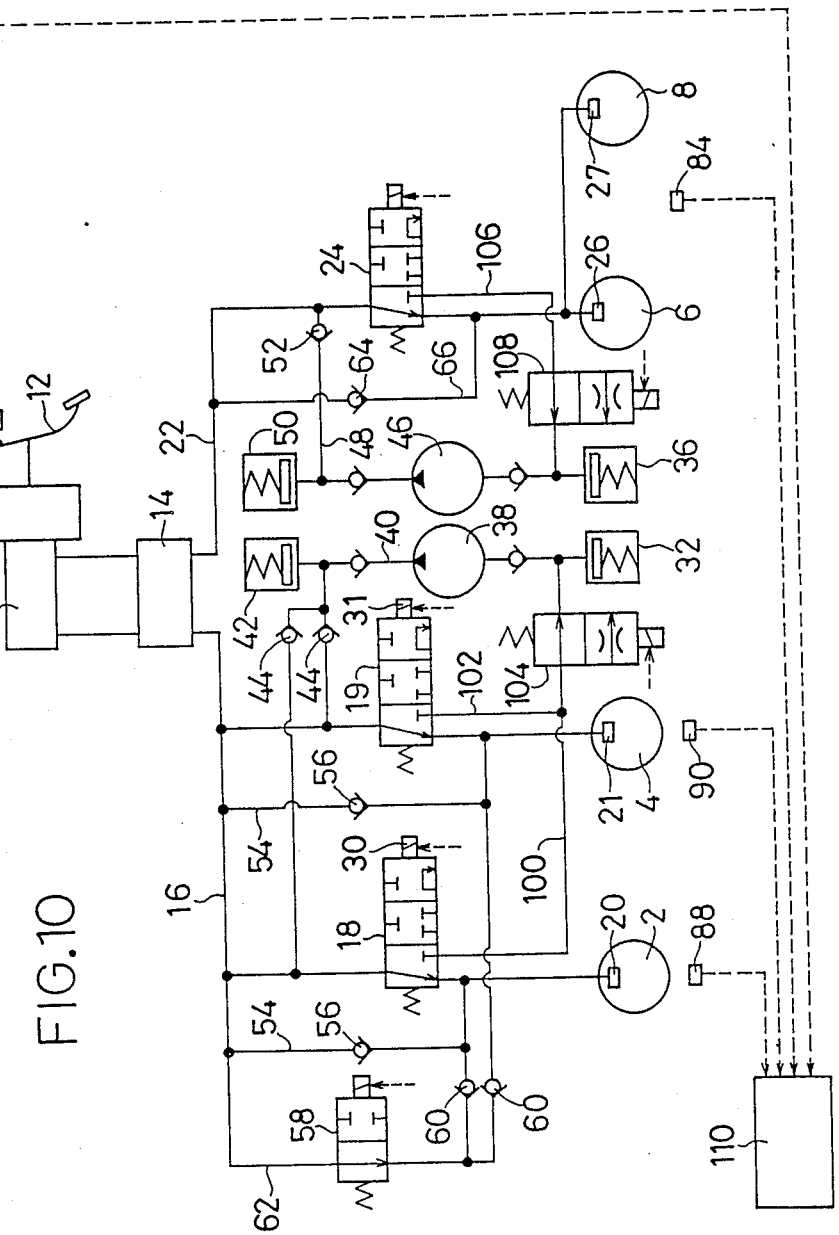
FIG. 10 is a hydraulic circuit diagram showing a further embodiment of the braking system of the invention.

In FIG. 10, reference numeral 10 designates a master cylinder having two mutually independent pressure chambers each of which produces a fluid pressure (pressure of a brake fluid) proportional to an operating force that is applied to a brake operating member in the form of a brake pedal 12. The fluid pressure produced in one of the two pressure chambers is fed into a primary fluid passage 16 via a proportioning/by-pass valve 14. The primary fluid passage 16 is split into two branch lines which are connected to front wheel cylinders 20, 21 via respective solenoid-operated pressure control valves 18, 19. On the other hand, the fluid pressure produced in the other pressure chamber is fed into another primary fluid passage 20 via the proportioning/by-pass valve 14. The primary fluid passage 20 is connected to a solenoid-operated pressure control valve 24, which in turn is connected to two rear wheel cylinders 26, 27 via respective branch lines. The two front wheel cylinders 20, 21 are provided on the respective left and right front wheels 2, 4 of the vehicle, while the two rear wheel cylinders 26, 27 are provided on the respective left and right rear wheels 6, 8 of the vehicle. As described above, the instant braking system has two independent hydraulic arrangements, i.e., front hydraulic arrangement for the front wheel cylinders 20, 21, and rear hydraulic arrangement of the rear wheel cylinders 26, 27.

While the front hydraulic arrangement including the primary fluid passage 16 is intact or normal, the proportioning/by-pass valve 14 reduces the fluid pressure in the rear hydraulic arrangement including the primary fluid passage 22, to a suitable level proportional to the fluid pressure in the front hydraulic arrangement or the pressure in the master cylinder 10. While the front hydraulic arrangement is defective, the valve 14 supplies the master cylinder pressure to the primary fluid passage 22 of the rear hydraulic arrangement, without reducing the master cylinder pressure.

The solenoid-operated pressure control valves 18, 19 are normally placed in their pressure-increase position in which the front wheel cylinders 20, 21 and the master cylinder 10 communicate with each other, as indicated in FIG. 1. When solenoids coils 30, 31 of the pressure control valves 18, 19 are energized with a comparatively large amount of electric current, however, the pressure control valves 18, 19 are switched to their pressure-decrease position in which the front wheel cylinders 20, 21 are disconnected from the master cylinder 10 and brought into communication with a reservoir 32. When the solenoid coils 30, 31 are energized with a comparatively small amount of electric current, the pressure control valves 18, 19 are switched to their pressure-hold position in which the front wheel cylinders 20, 21 are disconnected from both the master cylinder 10 and the reservoir 32. The solenoid-operated pressure control valve 24 is operated in response to the switching action of the pressure control valves 18, 19. That is, the pressure control valve 24 is selectively placed in one of a pressure-increase position for fluid communication between the rear wheel cylinders 26, 27 and the master cylinder 10, a pressure-decrease position for fluid communication between the rear wheel cylinders 26, 27 and a reservoir 36, and a pressure-hold position for disconnection of the rear wheel cylinders 26, 27 from both of the master cylinder 10 and the reservoir 36.

The brake fluid in the reservoir 32 is pumped up by a pump 38, and is returned to the primary fluid passage 16 via a pump passage 40. The pump passage 40 is provided with a damper 42 for reducing a pressure pulsation of the fluid delivered by the pump 38, and check valves 44 for preventing flows of the fluid from the primary fluid passage 16 into the damper 42. Similarly, the rear hydraulic arrangement has a pump 46, a pump passage 48, a damper 50 and a check valve 52.

The front hydraulic arrangement includes return passages 54 which permit the brake fluid to be returned from the front wheel cylinders 20, 21 to the master cylinder 10, while by-passing the respective solenoid-operated pressure control valves 18, 19. Each return passage 54 is provided with a check valve 56 for preventing the fluid from flowing from the master cylinder 10 toward the rear wheel cylinders 20, 21. The front hydraulic arrangement further includes a by-pass passage 62 provided with a normally-open solenoid-operated shut-off valve 58 and a check valve 60. When the brake fluid is supplied from the master cylinder 10 to the front wheel cylinders 16, the fluid is fed through the shut-off valve 58 as well as the pressure control valves 18, 19 whereby the fluid is supplied to the wheel cylinders 20, 21 at a sufficiently high flow rate. On the other hand, the rear hydraulic arrangement includes a return passage 66 provided with a check valve 64, but does not have a by-pass passage.

The solenoid-operated pressure control valves 18, 19 and 24 are controlled by the electronic anti-lock control arrangement of FIG. 2 which includes an anti-lock control computer 70. This computer 70 incorporates a central processing unit (CPU) 72, a read-only memory (ROM) 74, a random-access memory (RAM) 76, and a bus 78 for interconnecting these elements 72, 74, 76. To the bus 78 is connected an input interface 80 which receives input signals from: a rear wheel speed sensor 84 for detecting an average rotating speed of the rear wheels 6, 8; a left front wheel speed sensor 88 for detecting a rotating speed of the left front wheel 2; a right front wheel speed sensor 90 for detecting a rotating speed of the right front wheel 4; and a brake switch 92 which detects an amount of operation of the brake pedal 12. The rear wheel speed sensor 84 is disposed so as to detect a rotating speed of a propeller shaft of the vehicle. To the bus 78, there is also connected an output interface 94, through which output signals are applied to the solenoid-operated pressure control valves 18, 19, 24 and the solenoid-operated shut-off valve 58.

Figure 6:
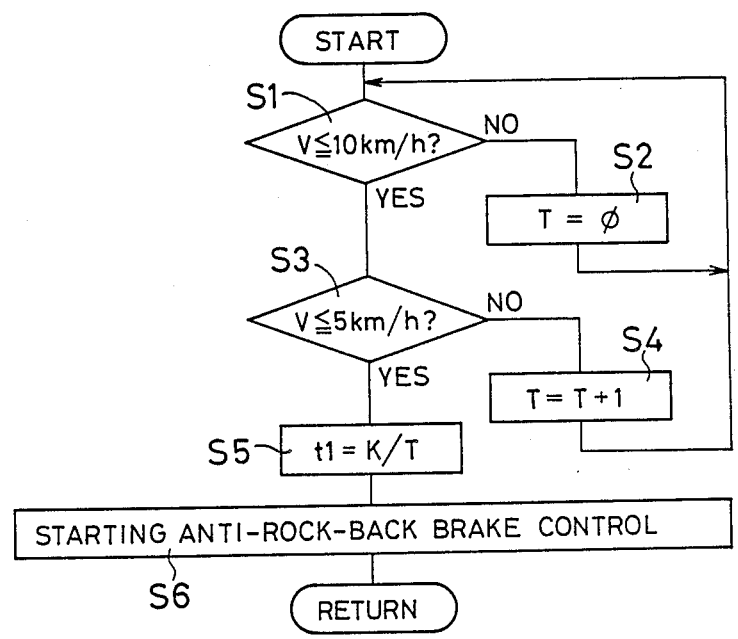
FIG. 6 is a flow chart illustrating an example of an anti-rock-back control program stored in a read-only memory shown in FIG. 2.

The CPU 72 incorporates a timer 98. The function of this timer 98 will be described later. The ROM 74 stores various control programs including control routines such as anti-lock brake control routine, and anti-rock-back brake control routines of FIGS. 6 and 9 which are executed upon stopping of the vehicle by activation of the brake pedal 12.

In the thus constructed anti-lock braking system having the mutually independent front and rear hydraulic arrangements, the CPU 72 performs the control programs stored in the ROM 74, at predetermined cycle times.

With the anti-lock brake control routine and other control routines executed, the speeds of the individual wheels 2, 4, 6, 8 of the vehicle are obtained from the signals from the speed sensors 84, 88, 90, and the running speed of the vehicle is calculated based on the highest one of the speeds detected by the speed sensors 84, 88, 90. When the rotating speed of each wheel 2, 4, 6, 8 falls below a desired or target speed which is lower than the vehicle running speed by an amount corresponding to an optimum slip ratio of the wheel, the braking pressure in the corresponding wheel cylinder 20, 21, 26, 27 is lowered, maintained or raised by means of the appropriate solenoid-operated pressure control valves 18, 19, 24 and the solenoid-operated shut-off valve 58, so that the actual running speed of the vehicle substantially coincides with the determined target speed.

The above operation is a well known anti-lock brake control operation. When the vehicle is brought to a complete stop by brake application with the brake pedal 12 depressed, the anti-rock-back brake control operation as indicated in FIG. 3 is implemented, in order to reduce an amount of a rock-back motion of the vehicle driver and passengers upon stopping of the vehicle.

The graphs of FIG. 3 indicate relationships among the wheel cylinder pressure, vehicle deceleration rate and speed, and pressure control pattern of the wheel cylinders. When the vehicle speed is sufficiently lowered down to a reference value VA, the CPU 72 commands the solenoid-operated pressure control valves 18, 19, 24 to regulate the braking pressures in the respective wheel cylinders 20, 21, 26, 27, as indicated in the third and fourth graphs (as counted from the uppermost graph) of FIG. 3. As a result, the vehicle speed is gradually lowered to the zero level, with the vehicle deceleration rate decreased stepwise, as indicated in the first and second graphs. The deceleration rate is almost zeroed when the vehicle speed is zeroed.

Where the anti-rock-back brake control operation is implemented by lowering the braking pressures in the wheel cylinders 20, 21, 26, 27 by utilizing the pressure control valves 18, 19, 24 of the anti-lock brake control arrangement, the rate of decrease in the braking pressures tends to be excessively high (usually, 800–1000 kgf/cm$^2$/sec) if the braking pressures are lowered to the required level at one time. In this case, the braking system suffers from a pitching phenomenon, or difficulty in suitably regulating the braking pressures. To solve this problem, the present embodiment is adapted to lower or decrease the braking pressure in each wheel cylinder, in a plurality of steps (e.g., four or five steps), such that the wheel cylinder pressure is lowered for a relatively short time duration for each step. Namely, the pressure decrease cycle is effected at predetermined intervals, so that the vehicle is decelerated at a relatively low rate. Described more specifically, after the vehicle speed has been lowered to the reference value VA, the wheel cylinder pressure is alternately lowered and maintained for respective time periods of t1 and t2. This pressure-decrease and pressure-hold cycle is repeated several times until the vehicle is completely stopped. In this manner, the wheel cylinder pressure and the vehicle deceleration rate are reduced in steps, and the vehicle is brought to a complete stop. At the end of the anti-rock-back brake control operation, the wheel cylinder pressure is raised to hold the vehicle at the stopped position, as indicated in the fourth graph of FIG. 3.

In the case where the wheel cylinder pressure is relatively low when the vehicle speed reaches the reference value VA, as indicated in dashed line in the third graph of FIG. 3, the wheel cylinder pressure is further reduced by the stepwise decrease as indicated above. In this case, the wheel cylinder pressure is excessively lowered, and the vehicle speed cannot be zeroed in a predetermined time period after the anti-rock-back brake control operation is initiated. Namely, the anti-rock-back brake control operation ends with a sudden increase in the wheel cylinder pressure while the vehicle is still running. In this case, therefore, the vehicle is abruptly stopped and the vehicle driver and passengers are subject to a rock-back motion upon stopping of the vehicle.

To avoid such a drawback where the wheel cylinder pressure is relatively low when the anti-rock-back brake control operation is started, the pressure-decrease time t1 for each control cycle is suitably reduced, as indicated in one-dot chain line in the fourth graph of FIG. 3, the wheel cylinder pressure will not be zeroed before the vehicle is stopped, as indicated in one-dot chain line in the third graph of FIG. 3. In other words, the reduction in the pressure-decrease time t1 makes it possible to avoid an excessive decrease in the wheel cylinder pressure in the anti-rock-back brake control operation. Accordingly, the vehicle speed can be zeroed in the predetermined time, or the braking distance is not increased. In this case, the wheel cylinder pressure is increased after the vehicle is stopped, whereby the vehicle driver and passengers are not subject to a rock-back motion.

A similar effect can be obtained by lowering the reference value of the vehicle speed from VA to VB as indicated in one-dot chain line in the first graph of FIG. 3, rather than reducing the pressure-decrease time t1, so that the anti-rock-back brake control operation is started when the vehicle speed is reduced down to the lower reference value VB. In other words, the reference vehicle speed at which the anti-rock-back brake control operation is started decreases with a decrease in the wheel cylinder pressure upon starting of the control operation. This method also prevents the wheel cylinder pressure from being zeroed before the vehicle is stopped, permitting the vehicle to be stopped in the predetermined anti-rock-back control time, whereby the rock-back motion upon stopping of the vehicle can be effectively avoided.

Figure 4:
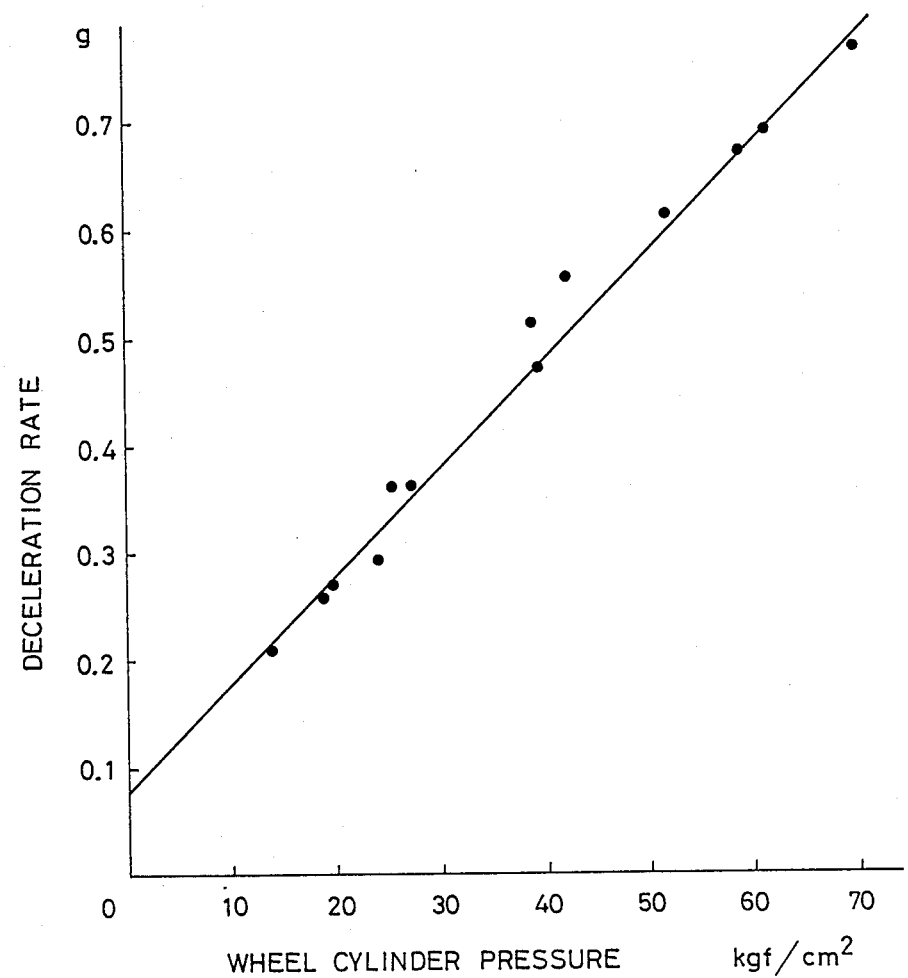
FIG. 4 is a graph indicating a relationship between a deceleration rate of the vehicle and a braking pressure in wheel cylinders of the braking system.

It follows from the above description that the anti-rock-back brake control operation is performed depending upon the wheel cylinder pressure upon starting of the operation. This wheel cylinder pressure as a control parameter for the anti-rock-back brake control operation is estimated by the deceleration rate of the vehicle up to the moment when the brake control operation is initiated. The graph in FIG. 4 indicates a relationship between the wheel cylinder pressure and the vehicle deceleration rate, which was obtained by experiments on a level road. While none of the four wheels 2, 4, 6, 8 of the vehicle are locking, the wheel cylinder pressure is generally proportional to the vehicle deceleration rate, as shown in FIG. 4. Accordingly, the wheel cylinder pressure may be estimated depending upon the deceleration rate before starting the anti-rock-back brake control operation. The pressure-decrease time, and the reference vehicle speed at which the anti-rock-back brake control operation is started may be determined, on the assumption that the wheel cylinder pressure decreases with the deceleration rate. Namely, the pressure-decrease time for each control cycle and the reference vehicle speed are determined or changed based on the estimated deceleration rate of the vehicle before the anti-rock-back brake control operation is initiated.

Figure 5:
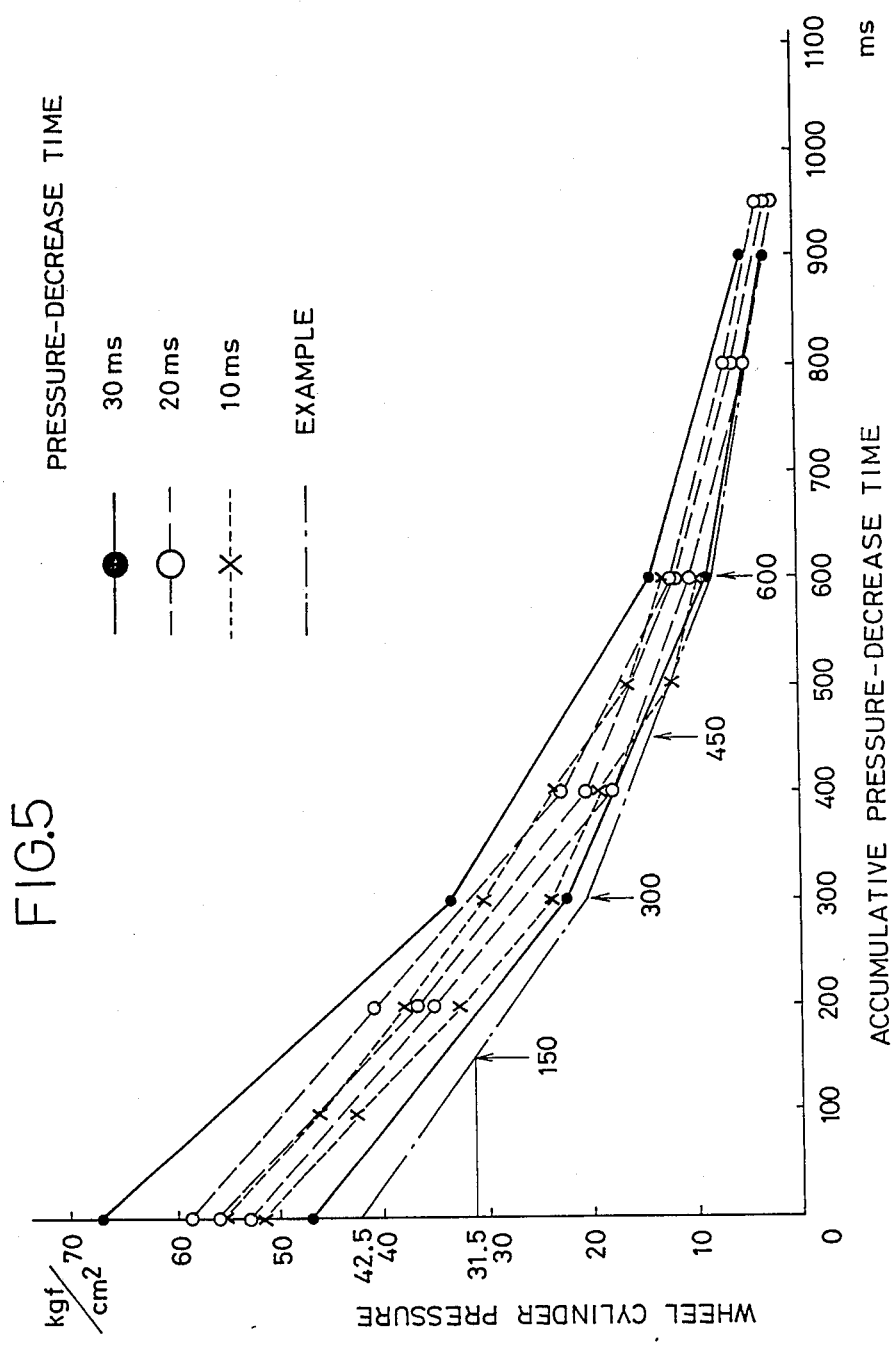
FIG. 5 is a graph indicating a relationship between the braking pressure and an accumulative decrease time of the braking pressure.

The wheel cylinder pressure after the start of the anti-rock-back brake control operation can be estimated from the time period (hereinafter referred to as "accumulative pressure-decrease time") after the start. The graph in FIG. 5 indicates relationships between the wheel cylinder pressure and the accumulative pressure-decrease time, which were obtained by experiments. The accumulative pressure-decrease time is obtained by multiplying the pressure-decrease time t1 for each control cycle (pressure decrease and the following pressure hold) by the number "N" of the control cycles (number of steps in which the wheel cylinder pressure is lowered). Since the wheel cylinder pressure after the start of the anti-rock-back brake control operation can be estimated, the deceleration rate of the vehicle after the start can be estimated from the relationships of FIG. 4, and the rate of change in the vehicle speed can be estimated from the deceleration rate.

In the instant embodiment, the ordinary anti-lock brake control operation and the anti-rock-back brake control operation have the following relation. As a rule, the anti-rock-back brake control operation will not be performed if the anti-lock brake control operation (involving a pressure decrease command followed by a pressure increase or hold command) is initiated at a vehicle speed of 10 km/h or higher. If the anti-lock brake control operation is not performed while the vehicle is running at 10 km/h or higher, the anti-lock brake control operation will not be performed and the anti-rock-back brake control operation will be performed after the vehicle speed falls below 10 km/h.

The anti-lock brake control routine and the anti-rock-back brake control routine are stored in the ROM 74. Since the anti-lock brake control routine is well known in the art, no further description thereof will be provided. The anti-rock-back brake control routine will be described in detail, referring to the flow chart of FIG. 6.

When the brake switch 92 is turned on, the signals from the speed sensors 84, 88, 90 indicative of the wheel speeds are read in at predetermined time intervals, and the vehicle speed V is calculated based on the wheel speeds. Then, the control flow goes to step S1 of the anti-rock-back control routine, to determine whether the calculated vehicle speed V is lowered to 10 km/h, or not. If the vehicle speed V is higher than 10 km/h, the control flow goes to step S2 in which the timer 98 is reset or zeroed. If the vehicle speed V is lowered to 10 km/h, step S1 is followed by step S3 to determine whether the vehicle speed V is equal to or lower than the reference value of 5 km/h. If a negative decision is made in step S3, the timer 98 is incremented. That is, the timer 98 is incremented at a predetermined time interval as long as the vehicle speed falls within the range between 10 km/h and 5 km/h. Thus, the time period required for the vehicle speed to be lowered from 10 km/h to 5 km/h is measured as the count of the timer 98. It will be understood that the vehicle deceleration rate decreases with an increase in the count of the timer 98.

Figure 7:
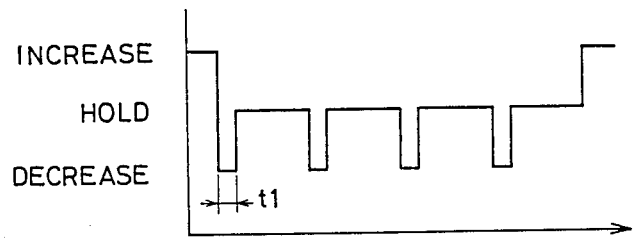
FIG. 7 is a view indicating a pressure-decrease pattern used according to the control program of FIG. 6.
Figure 8:
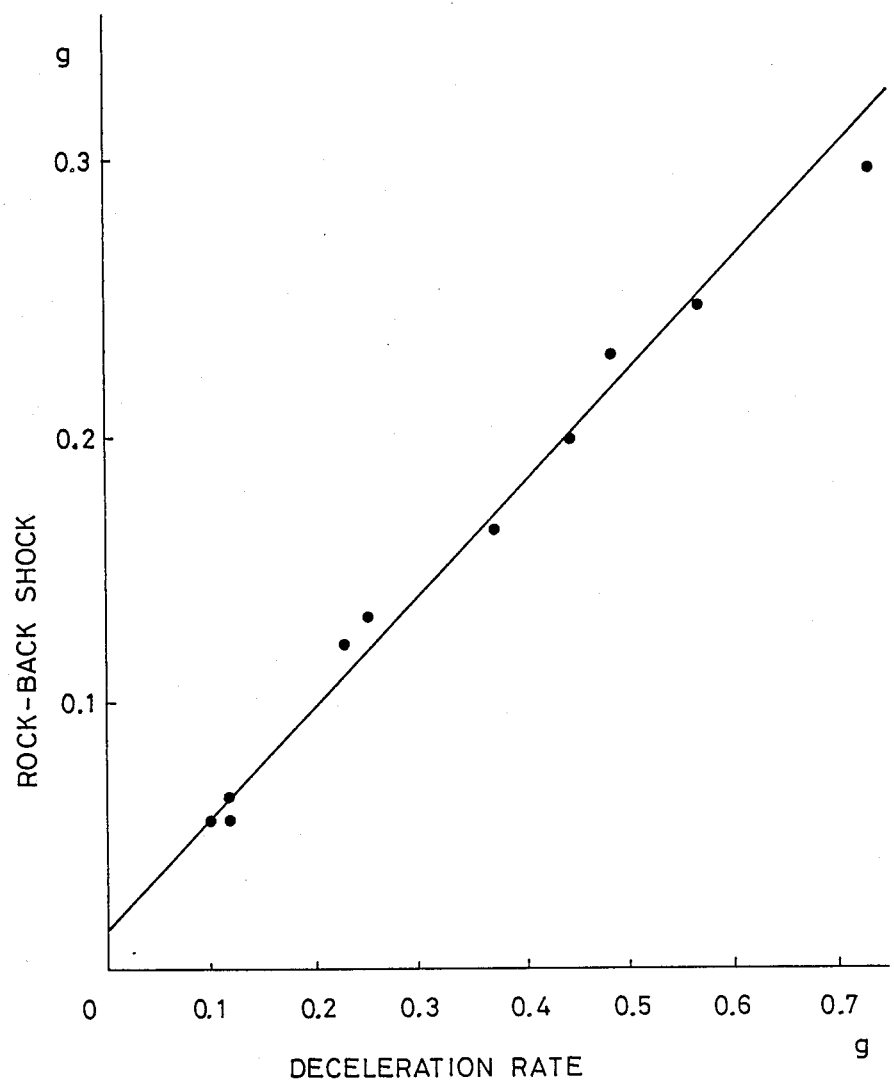
FIG. 8 is a graph indicating a relationship between a rock-back shock given to a driver of the vehicle and the deceleration rate of the vehicle.

When the vehicle speed V falls below the reference value of 5 km/h, step S3 is followed by step S5 in which the pressure-decrease time t1 of the pressure-decrease pattern of FIG. 7 is calculated by dividing a predetermined constant K by a time period (count T) during which the vehicle speed V was lowered from 10 km/h to 5 km/h. Thus, the pressure-decrease time t1 is determined depending upon the deceleration rate of the vehicle while the speed V was lowered from 10 km/h to 5 km/h. That is, the lower the vehicle deceleration rate (the larger the count T of the timer 98), the shorter the pressure-decrease time t1. The constant K is determined by pressure-decrease characteristics of the solenoid-operated pressure control valves 18, 19, 24 (rate of decrease in the wheel cylinder pressure), braking characteristics of the vehicle, and other factors.

Based on the pressure-decrease time t1 thus determined, the anti-rock-back brake control operation is performed as indicated in FIG. 7. More particularly, the wheel cylinder pressure is lowered in steps, with the determined pressure-decrease time t1 followed by a predetermined pressure-hold time for each step. With several control cycles each consisting of the pressure-decrease and pressure-hold times, the wheel cylinder pressure is lowered so as to lower the vehicle deceleration rate, so that the deceleration rate is almost zeroed when the vehicle speed is zeroed. After the final control cycle, the wheel cylinder pressure is raised to hold the vehicle at the stopped position.

To further illustrate the instant embodiment of the braking system, a specific example of the anti-rock-back brake control operation will be described.

In the present example, the anti-rock-back brake control operation consists of four control cycles (N=4: four pressure-decrease steps and four pressure-hold steps), the cycle time t3 (pressure-decrease time t1+pressure-hold time t2) being 150 ms (ms=$10^{-3}$ sec). The operation is initiated at the vehicle speed of 5 km/h, after the vehicle deceleration at 0.5 g from 10 km/h to 5 km/h. In this case, the wheel cylinder pressure at the vehicle speed of 5 km/h is estimated as 42.5 kgf/cm$^2$, from the relationship of FIG. 4. Suppose the pressure-decrease time t1 is 15 ms, the wheel cylinder pressure 150 ms after the start of the anti-rock-back brake control operation is 31.5 kgf/cm$^2$, as indicated in one-dot chain line in FIG. 5. The deceleration rate during this 150 ms period is 0.39 g, as indicated in the graph of FIG. 4. The vehicle speed 150 ms after the start of the operation can be obtained by subtracting a value of (deceleration rate x time period) from the initial vehicle speed of 5 km/h (reference speed). Since the deceleration rate, time period and initial vehicle speed are 0.39 g, 150 ms and 5 km/h, respectively, the vehicle speed in question is 2.93 km/h (0815 m/s).

In the same manner, the wheel cylinder pressure (average value) and vehicle deceleration rate during the 150 ms–300 ms period after the start of the anti-rock-back brake control operation are calculated as 25.0 kgf/cm$^2$ and 0.28 g, respectively. Further, the vehicle speed 300 ms after the start is calculated as 1.45 km/h (0.403 m/s), and the vehicle speed 450 ms after the start (after the third pressure-decrease step) is calculated as 0.399 km/h (0.0943 m/s). The vehicle speed is zeroed 600 ms after the start (after the fourth pressure-decrease step). Namely, the vehicle is stopped after the fourth pressure-decrease and pressure-hold cycle. At this time, the wheel cylinder pressure and the vehicle deceleration rate are 7.5 kgf/cm$^2$, and 0.15 g, respectively. As a result, the amount of the rock-back shock can be reduced to the same extent as experienced when the vehicle is stopped with a considerably light degree of brake application.

Figure 9:
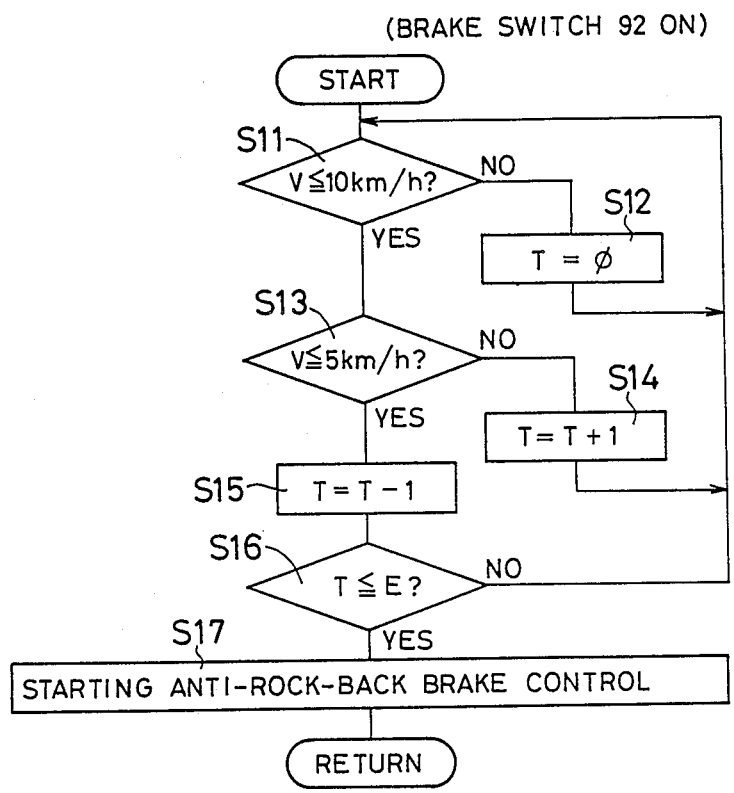
FIG. 9 is a flow chart illustrating another example of the anti-rock-back control program stored in the read-only memory, according to another embodiment of the invention.

While the anti-rock-back brake control routine used in the first embodiment of the present invention has been described, the principle of the invention may be practiced by executing an anti-rock-back brake control routine as illustrated in FIG. 9, which will be described.

In this modified embodiment, the reference vehicle speed at which the anti-rock-back brake control operation is initiated is lowered with the deceleration rate of the vehicle prior to the start of the operation. Steps S11–S14 of the control routine of FIG. 9 are similar to steps S1–S4 of the control routine of FIG. 6. That is, the time period necessary for the vehicle speed V to be lowered from 10 km/h to the reference value of 5 km/h is measured as the count T of the timer 98, in steps S11, S13 and S14. The vehicle deceleration rate decreases with an increase in the measured time period.

If an affirmative decision (YES) is obtained in step S13, the control flow goes to step S15 wherein the count T of the timer 98 is decremented, and then goes to step S16 to determine whether the count T is equal to or lower than a predetermined value E. Steps S11, S13, S15 and S16 are repeatedly executed until the count T reaches the predetermined value E. Like the constant K used in the control routine of FIG. 6, this value E is determined depending upon the pressure-decrease characteristics of the anti-lock brake control arrangement and the braking characteristics of the vehicle.

When the count T of the timer 98 reaches the predetermined value E, the control flow goes to step S17, in which the anti-rock-back brake control operation is initiated to lower the wheel cylinder pressure in several steps, with the fixed pressure-decrease time T1 for each step. The reference vehicle speed at which this anti-rock-back brake control operation is initiated is lowered with an increase in the count T of the timer 98 (during the vehicle deceleration from 10 km/h to 5 km/h). In other words, the reference vehicle speed is lowered with the deceleration rate of the vehicle. After the several control cycles (after the several pressure-decrease steps), the vehicle is stopped and the wheel cylinder pressure is raised to hold the vehicle at the stopped position.

As described above, the determination of the reference vehicle speed depending upon the prior vehicle deceleration rate prevents an excessive amount of reduction in the wheel cylinder pressure and permits the vehicle to be stopped with a predetermined braking distance, and a reduced amount of rock-back shock given to the vehicle driver/passengers, even if the vehicle deceleration rate and the wheel cylinder pressure upon starting of the anti-rock-back brake control operation are considerably low. Thus, the anti-rock-back brake control routine of FIG. 9 provides substantially the same result as the control routine of FIG. 6.

In the illustrated embodiments described above, the wheel speed sensors 84, 88, 90 and the anti-lock control computer 70 constitute vehicle speed detecting means for detecting the vehicle speed, and the portions of the computer 70 which are assigned to execute step S6 or S17 constitute pressure-decrease control means for lowering the braking pressures in the wheel cylinders 20, 21, 26, 27 in a plurality of steps. Further, the portions of the computer 70 which are assigned to execute steps S1, S3 and S4, or S11, S13 and S14 substantially constitute deceleration detecting means for detecting the deceleration rate of the vehicle. The portion of the computer 70 assigned to execute step S5 substantially constitutes decrease-time determining means for determining the time duration during which the wheel cylinder pressures or braking pressures are lowered in each step. Further, the portions of the computer 70 assigned to implement steps S15, S16, etc. constitute means for determining the reference speed of the vehicle at which the anti-rock-back brake control operation is initiated.

While the anti-rock-back brake control operation in the illustrated embodiments is executed based on the rate of the vehicle deceleration from 10 km/h down to 5 km/h, suitable modifications may be made depending upon the specific braking systems, and/or the specific type or model of the vehicle.

In the illustrated embodiments, either the pressure-decrease time t1 or the reference vehicle speed is selectively controlled based on the vehicle deceleration rate, it is possible that the anti-rock-back brake control routine may be formulated such that the above two methods of control are suitably combined.

Although the anti-rock-back brake control operation in the illustrated embodiments utilizes the pressure control arrangement adapted to perform the anti-lock brake control operation, an exclusive pressure control arrangement may be provided to implement the intended brake control operation for reducing the rock-back shock upon stopping of the vehicle.

Figure 11:
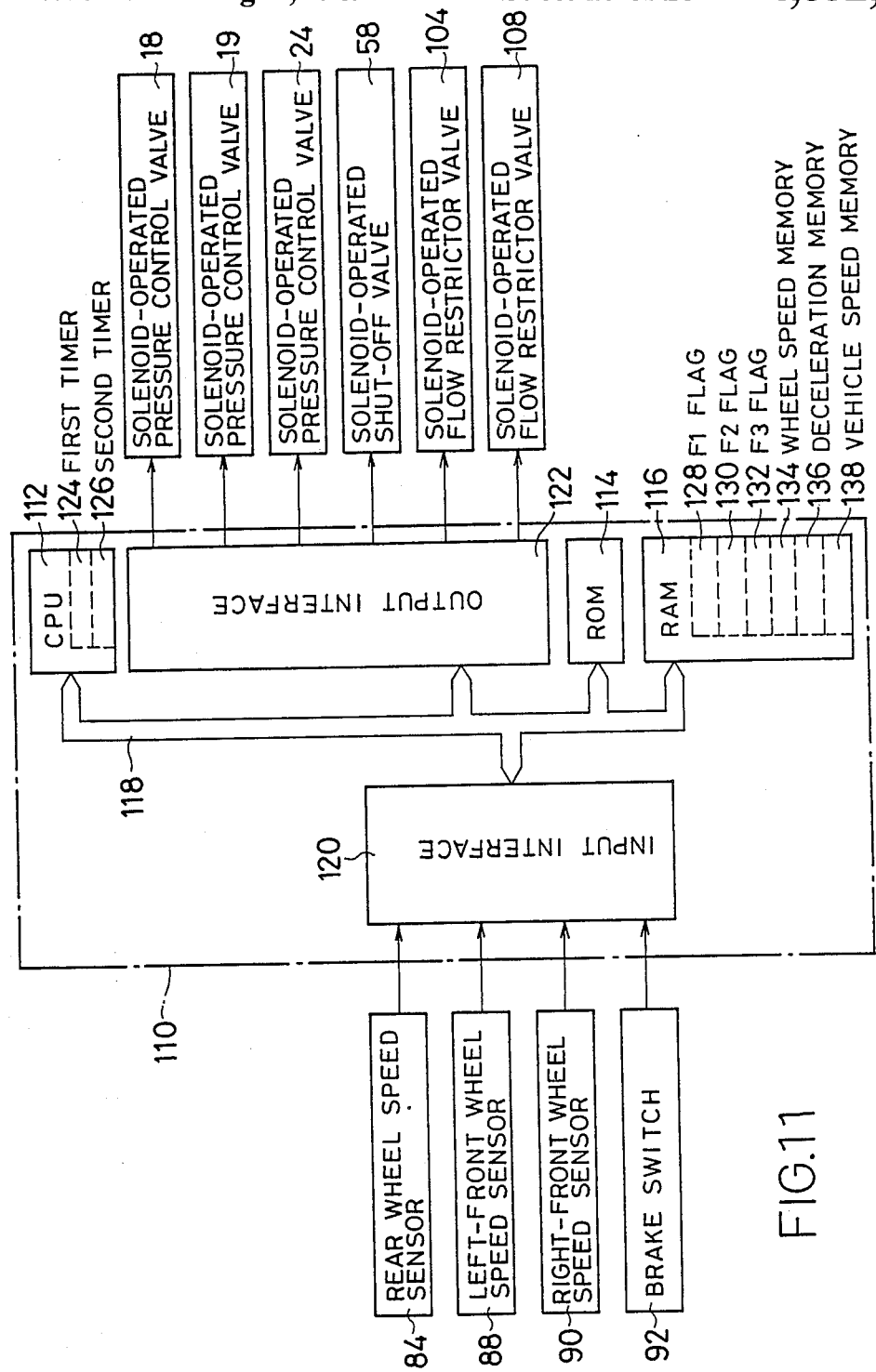
FIG. 11 is a block diagram showing a control arrangement for the braking system of FIG. 10.

Referring to FIGS. 10 and 11, a third embodiment of the present invention will be described. In the interest of brevity and simplification, the same reference numerals as used in FIGS. 1 and 2 are used in FIGS. 10 and 11 to identify the corresponding elements, and no redundant description of these elements will be provided.

In the instant modified embodiment, the solenoid-operated pressure control valve 18 for the left front wheel 2 is connected to the reservoir 32 by a reservoir passage 100 which is provided with a solenoid-operated flow restrictor valve 104. The solenoid-operated pressure control valve 19 for the right front wheel 4 is connected to the reservoir passage 100, at a position between the flow restrictor valve 104 and the pressure control valve 18. The reservoir passages 100 and 102 have a cross sectional area which permits sufficient flows of the brake fluid from the wheel cylinders 20, 21 during an anti-lock brake control operation.

The solenoid-operated flow restrictor valve 104 is operable between a non-operated position and an operated position. In the non-operated position, the discharge flows of the brake fluid from the wheel cylinders 20, 21 are not restricted by the restrictor valve 104, whereby the fluid discharged from the wheel cylinders 20, 21 can be admitted into the reservoir 32, at a sufficiently high rate. In the operated position, the fluid flow through the restrictor valve 104 is restricted, so that the fluid discharged from the wheel cylinders 20, 21 is admitted into the reservoir 32, at a comparatively low rate. During the anti-lock brake control operation, the solenoid of the restrictor valve 104 is deenergized to place the valve 104 in its non-operated position. During an anti-rock-back brake control operation, however, the solenoid is energized to place the restrictor valve 104 in its operated position, thereby restricting the fluid flows through the reservoir passages 100, 102 toward the reservoir 32.

While the reservoir passages 100, 102 and restrictor valve 104 for the front hydraulic arrangement have been described, a reservoir passage 106 connecting the the solenoid-operated pressure control valve 24 and the reservoir 36 for the rear hydraulic arrangement is also provided with a solenoid-operated flow restrictor valve 108. This valve 108 has the same function as the valve 104.

The thus constructed hydraulically operated brake device of FIG. 10 is controlled by a control arrangement as shown in FIG. 11, which includes a computer 110. As indicated in FIG. 11, the computer 110 incorporates a CPU 112, a ROM 224, a RAM 116, a bus 118, an input interface 120, and an output interface 122. The input interface 120 is connected to the rear wheel speed sensor 84, front wheel speed sensors 88, 90, and brake switch 92, as in the first and second embodiments. On the other hand, the output interface 122 is connected to the solenoid-operated pressure control valves 18, 19, 24, solenoid-operated shut-off valve 58, and solenoid-operated flow restrictor valves 104, 108.

The CPU 112 incorporates a first timer 124 and a second timer 126, and the RAM 116 incorporates an F1 flag 128, three F2 flags 130, an F3 flag 132, a WHEEL SPEED memory 134, a DECELERATION memory 136 and a VEHICLE SPEED memory 138. The ROM 114 stores various control programs which include a main control routine for brake application, as illustrated in the flow chart of FIG. 12, and anti-lock and anti-rock-back brake control routines as illustrated in the flow chart of FIG. 13.

Figure 12:
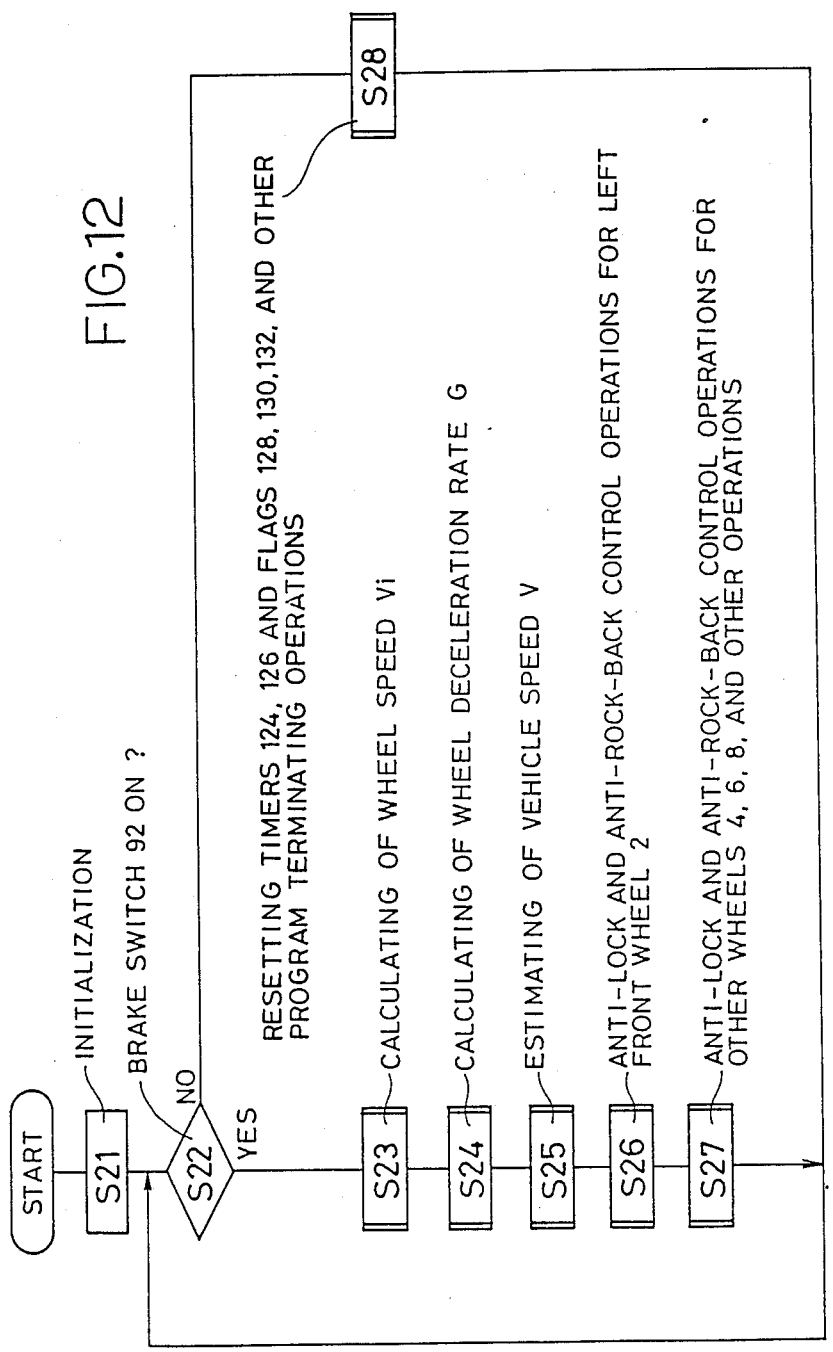
FIGS. 12 and 13 are flow charts illustrating control programs stored in a read-only memory of the computer used in the control arrangement of FIG. 11.
Figure 13:
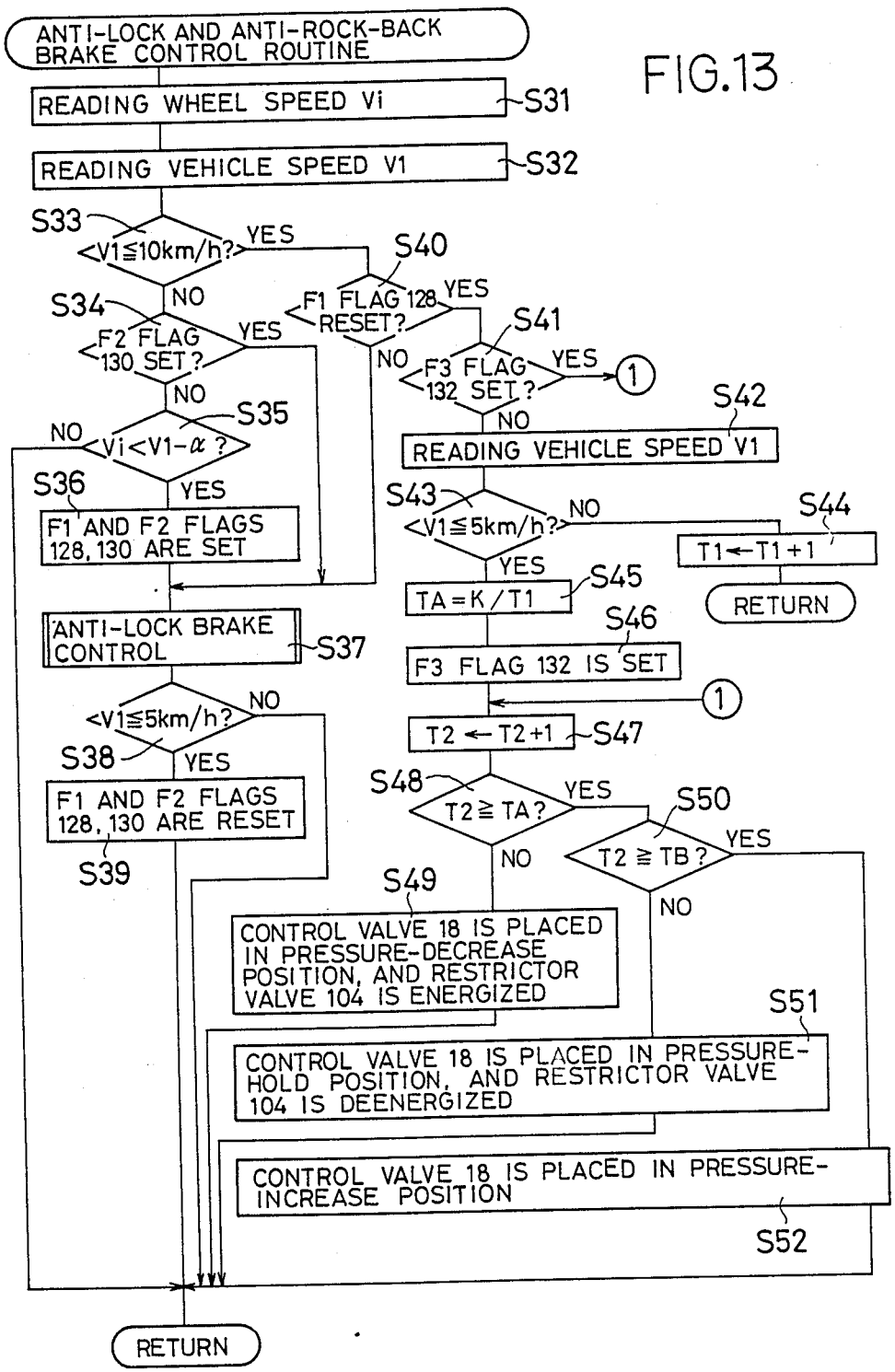

Referring to FIGS. 12 and 13, there will be described the anti-lock and anti-rock-back brake control operations according to the instant embodiment.

Upon power application to the computer 110, the control flow goes to step S21 of the main control routine of FIG. 12, in which the various elements such as the first and second timers 124, 126, and F1–F3 flags 128, 130, 132 are reset. Step S21 is followed by step S22 to determine whether the brake switch 92 is on or not. While the brake pedal 12 is not operated, a negative decision (NO) is obtained in step S22, and the control flow goes to step S28 wherein the main control routine is terminated by resetting the first and second timers 124, 126, F1–F3 flags 128, 130, 132 and other elements. Then, the control flow returns to step S22.

While the brake pedal 12 is operated, an affirmative decision (YES) is obtained in step S22, and this step is followed by step S23 in which the CPU 112 calculates the wheel speed Vi, and the calculated wheel speed Vi is stored in the WHEEL SPEED memory 134. In the next step S24, the wheel deceleration rate G is calculated, and the calculated deceleration rate G is stored in the DECELERATION memory 136. Then, the control flow goes to step S25 to estimate the vehicle running speed V1, and store the estimated speed V1 in the VEHICLE SPEED memory 138. Step S25 is followed by step S26 in which the anti-lock and antirock-back brake control operations for the left front wheel 2 are implemented. In step S27, the anti-lock and anti-rock-back brake control operations for the other wheels 4, 6, 8, and other control operations are executed.

Referring to the flow chart of FIG. 13, the anti-lock and anti-rock-back brake control operations for the left front wheel 2 will be described in detail, by way of example.

It is noted that the operations for the left front wheel 2 shown in FIG. 13 are performed concurrently with the operations for the right front and rear wheels 4, 6, 8. The three F2 flags 130 are assigned to the left front wheel 2, right front wheel 4, and rear wheels 6, 8, and are set and reset independently of each other. On the other hand, the single F1 flag 128 is commonly assigned to the left front, right front and rear wheels 2, 4, 6–8. If the F1 flag 128 is set, this state of the flag 128 applies to all the wheels 2, 4, 6, 8. The control routine of FIG. 13 is repeatedly executed at a predetermined short cycle time.

Initially, the control flow goes to step S31 wherein the wheel speed Vi is read out from the WHEEL SPEED memory 134. Then, step S32 is executed to read the estimated vehicle speed V1 (hereinafter referred to as "vehicle speed") from the VEHICLE SPEED memory 138. Then, the control flow goes to step S33 to determine whether the vehicle speed V1 is equal to or lower than 10 km/h, or not. If the vehicle speed V1 is higher than 10 km/h, a negative decision (NO) is obtained in step S33, and the control flow goes to step S34 to determine whether the F2 flag 130 is set or not. Since the F2 flag 130 has been set in the initialization step S21 of the main control routine of FIG. 12, a negative decision (NO) is obtained in step S34 in the first control cycle of the control routine of FIG. 13. Accordingly, step S34 is followed by step S35 to determine whether the wheel speed Vi is smaller than the vehicle speed V1 minus a predetermined value $\alpha$. If an affirmative decision (YES) is obtained in step S35, this indicates that the braking force applied to the left front wheel 2 is relatively large in relation to the friction coefficient of the road surface, and that the slip ratio of the left front wheel 2 is excessively large, requiring an anti-lock brake control operation. In this case, step S35 is followed by step S36 to set the F1 and F2 flags 128, 130, and step S37 in which the anti-lock brake control operation is performed. In an initial period of the brake application, the solenoid-operated pressure control valve 18 is placed in the pressure-increase position as indicated in FIG. 10, and therefore the pressure control valve 18 is switched to its pressure-decrease position, to lower the braking pressure in the left front wheel 2. In this condition, the solenoid-operated flow restrictor valve 104 is placed in its non-operated position, permitting the sufficient flow of the fluid from the wheel cylinder 20 into the reservoir 32.

The control flow then goes to step S38 to determine whether the vehicle speed V1 is equal to or lower than 5 km/h, or not. Since the vehicle speed V1 is usually higher than 5 km/h in an initial period of the anti-lock brake application, a negative decision (NO) is obtained in step S38, and one sub-routine for controlling the braking pressure in the left front wheel cylinder 20 is terminated. Once the anti-lock brake control operation is started in step S37, an affirmative decision (YES) is obtained in step S34 in the subsequent control cycles, and steps S36 and S37 are skipped, whereby step S34 is followed by step S37 wherein the pressure in the left front wheel cylinder 20 is suitably controlled depending upon the slip condition of the left front wheel 2. That is, if the slip amount of the wheel 2 is excessive, the pressure control valve 18 is switched to the pressure-decrease position or kept in the pressure-hold position. Where the slip amount becomes sufficiently small, the pressure control valve 18 is switched to the pressure-increase position or kept in the pressure-hold position. In this manner, the braking pressure in the wheel cylinder 20 for the left front wheel 2 is maintained in an optimum range, such that the slip ratio of the wheel 2 is held within an optimum range.

If the vehicle speed V1 is lowered below 10 km/h during the anti-lock brake control operation, an affirmative decision (YES) is obtained in step S33, and the control flow goes to step S40 to determine whether the F1 flag 128 is in the reset state, or not. Since the F1 flat 128 has been set in step S36, a negative decision (NO) is obtained in step S40, and the anti-lock brake control operation is continuously performed in step S37. That is, once the anti-lock brake control operation is initiated, the anti-rock-back brake control operation in step S41 and subsequent steps will not be effected. It is noted that since the F1 flag 128 is common to the left front wheel 2, right front wheel 4, and rear wheels 6, 8, the setting of the F1 flag 128 in step S36 in the control routine for the left front wheel 2, for example, causes a negative decision in step S40 in the control routines for the other wheels 4, 6, 8, and consequently the anti-rock-back brake control operation will not be performed for the wheels 4, 6, 8, even if the anti-lock brake control operation is not performed for these wheels 4, 6, 8. Namely, if the pressure in one of the wheel cylinders 20, 21, 26, 27 is controlled in the anti-lock manner, none of the wheel cylinders are controlled in the anti-rock-back manner.

When the vehicle speed V1 becomes equal to or lower than 5 km/h during the anti-lock brake control operation, an affirmative decision (YES) is obtained in step S38, and step S39 is implemented to reset the F1 and F2 flags 128, 130, and the control flow returns to the main control routine of FIG. 12. That is, after the vehicle speed V1 is lowered to 5 km/h in the anti-lock mode, the anti-lock brake control operation is no longer necessary even though the brake pedal 12 is still kept depressed.

When the wheel speed Vi is higher than the vehicle speed V1 minus the predetermined value, while the vehicle speed is 15 km/h or higher, a negative decision (NO) is obtained in step S35, and the sub-routine is terminated. Namely, the anti-lock brake control operation is not executed since the slip ratio of the left front wheel 2 is held within the optimum range.

When the vehicle speed V1 is lowered to 10 km/h without an anti-lock brake control operation initiated for any of the wheels 2, 4, 6, 8, an affirmative decision (YES) is obtained in steps S33 and S40, and the anti-lock brake control operation is implemented for the left front wheel 2, in steps S41 and subsequent steps, as described below.

Step 41 is executed to determine whether the F3 flag 132 is in the set state or not. Since this F3 flag 132 has been set in the initialization step of the main control routine of FIG. 12, a negative decision is obtained in step S41, and step S42 is executed to read the vehicle speed V1 from the VEHICLE SPEED memory 138. Then, step S43 is implemented to determine whether the vehicle speed V1 is equal to or lower than 5 km/h. If a negative decision (NO) is obtained in step S43, the control flow goes to step S44 to increment the count T1 of the first timer 124, and then the control flow returns to the main control routine. Steps S31–S33 and S40–S44 are repeatedly executed until an affirmative decision (YES) is obtained in step S43. Thus, the time period for the vehicle deceleration from 10 km/h down to 5 km/h is measured as the count T1 of the first timer 124.

When the vehicle speed V1 is lowered to 5 km/h or lower, step S43 is followed by step S45 wherein a pressure-decrease time TA is calculated by dividing a predetermined constant K by the ded by the count T1. The constant K is determined, depending upon the pressure lowering characteristic of the pressure control valve 18 (rate of decrease in the pressure in the wheel cylinder 20), degree of flow restriction of the restrictor valve 104, and braking characteristics cf the vehicle, so as to determine the pressure-decrease time TA that permits the vehicle to be stopped with a minimum amount of a rock-back motion of the vehicle driver/passengers.

Since the pressure-decrease time TA is determined based on the time duration T1 during which the vehicle speed V1 has been lowered from 10 km/h to 5 km/h, the anti-rock-back brake control opeation is performed depending uypon the deceration rate of the vehicle before the vehicle speed V1 reaches 5 km/h. The value T1 increases with a decrease in the vehicle deceleration rate at the vehicle speed of 5 km/h. Since the wheel cylinder pressure decreases with the vehicle deceleration rate, the pressure-decrease time TA is reduced with the deceleration rate. By determining the pressure-decrease time TA as described above, the pressure in the wheel cylinder 20 can be suitably lowered, depending upon the specific braking condition upon starting of the anti-rock-back control operation, so that the vehicle is stopped, without an unnecessarily large braking distance or an excessive amount of the rock-back motion of the vehicle driver/passengers.

Then, the control flow goes to step S46 in which the F3 flag 132 is set, and step S27 in which a count T2 of the second timer 126 is incremented. Step S47 is followed by step S48 to determine whether the count T2 is equal to or greater than the pressure-decrease time TA. Since a negative decision (NO) is obtained in step S48 in an initial period after the vehicle speed V1 is lowered to 5 km/h, the control flow goes to step S49 to initiate or effect an anti-rock-back brake control operation. Described more specifically, the CPU 112 applies a pressure decrease command to the solenoid-operated pressure control valve 18, whereby the pressure control valve 18 is placed in the pressure-decrease position. Further, the solenoid-operated flow restrictor valve 104 is energized and thereby switched to the operated position to restrict the reservoir passage 100. Then, the control flow returns to the main control routine. When step S41 is executed in the next control cycle, an affirmative decision (YES) is obtained whereby the control flow goes to step S27, skipping steps S42–46 Therefore, steps S47, S48 and S49 are repeatedly executed until the pressure-decrease time TA has elapsed, as long as the brake pedal 12 is held depressed. Namely, the braking pressure of the left front wheel cylinder 20 is lowered for the time duration of TA.

Figure 14:
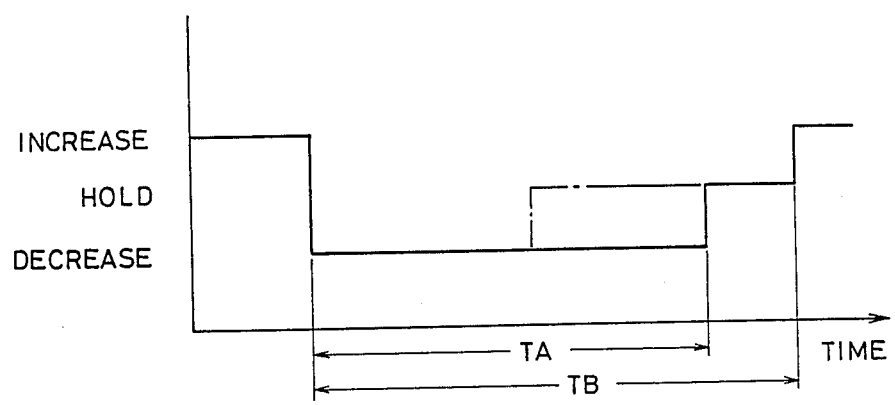
FIG. 14 is a time chart indicating pressure control signals generated during an anti-rock-back brake control operation according to the embodiment of FIGS. 10 and 11.

When the count T2 of the second timer 126 has become equal to the determined pressure-decrease time TA, an affirmative decision (YES) is obtained in step S48, and step S50 is executed to determine whether the count T2 is equal to or greater than a predetermined value TB. This value TB is a time duration between the moment when the pressure-control valve 18 is placed in the pressure-decrease position, and the moment when the pressure-control valve 18 is switched to the pressure-increase position after the same vale 18 is held in the pressure-hold position. Namely, the time duration TB is a sum of the pressure-decrease time and the pressure-hold time, as indicated in FIG. 14. The time duration TB is constant irrespective of the deceleration rate of the vehicle before the anti-rock-back operation is started, and is stored in the ROM 114. In an initial period of the anti-rock-back operation, a negative decision (NO) is obtained in step S50, and the control flow goes to step S51 in which the pressure control valve 18 is switched to the pressure-hold position, and the flow restrictor valve 104 is deenergized, i.e., switched to the non-operated position. Then, the control flow returns to the main control routine. Steps S31–S41, S47, S48, S50 and S51 are repeatedly executed until an affirmative decsion (YES) is obtained in step S50. After the pressure control valve 18 is held in the pressure-hold position for a predetermined time (TB−TA), an affirmative decision is obtained in step S50, and step S52 is executed to command the pressure control valve 18 to be switched to the pressure-increase position. The control flow then returns to the maian control routine.

Figure 15:
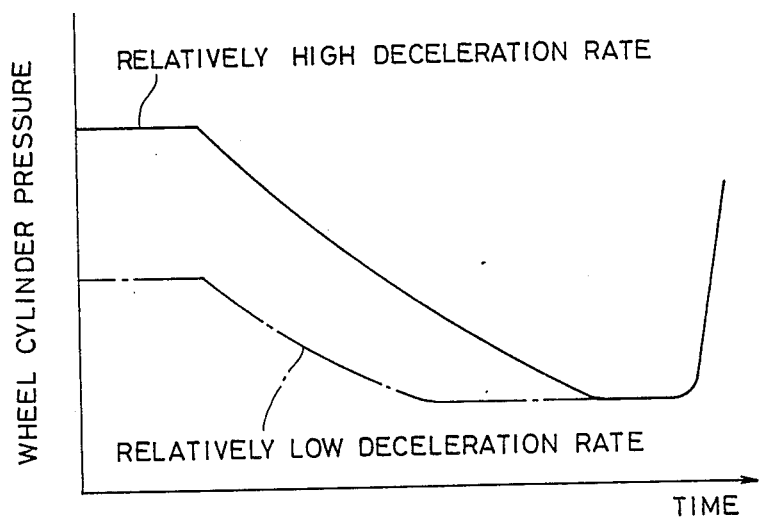
FIG. 15 is a graph showing a change in the wheel cylinder pressure during the anti-rock-back brake control operation.

In the anti-rock-back brake control operation as described above, the fluid pressure in the wheel cylinder 20 is continuously lowered for the determined pressure-decrease time TA. During this time duration TA, the reservoir passage 100 leading to the reservoir 32 is restricted by the flow restrictor valve 104, thereby preventing a sudden or rapid drop of the pressure in the left front wheel cylinder 20, and thus avoiding an unnecessary increase in the braking distance of the vehicle. In this arrangement, the fluid pressure in the wheel cylinder 20 is gradually and slowly lowered, as indicated in FIG. 15, with the valve 18 placed in the pressure-decrease position and the valve 104 placed in the operated or flow restricting position. Consequently, the vehicle can be smoothly stopped, without a pressure pulsation of the wheel cylinder 20, and without vibrations or noises of the vehicle.

It follows from the foregoing description that the speed sensors 84, 88, 90 and computer 110 constitute means for detecting the vehicle speed, while the portions of the ROM 114 and CPU 112 assigned to execute steps S31–S33 and S40–S52, timers 124, 126, flags 128, 130, 132, and memories 134, 138 substantially constitute stop control means for effecting the anti-rock-back brake control operation as described above.

In the illustrated embodiment described above, the flow restrictor valves 104 and 108 are provided in the reservoir passages 100, 106 which connect the pressure control valves 18 (19), 24 and the reservoirs 32, 36. However, the flow restrictor valves may be provided in fluid passages which connect the pressure control valves 18 (19), 24 and the wheel cylinders 20, 21, 26, 27.

The flow restrictor valves 104, 108 may have two or more flow restricting positions for providing different degrees of restriction of the fluid flow, or may be adapted to provide a continuously variable flow restriction, so that the fluid pressures in the wheel cylinders 20, 21, 26, 27 may be slowly lowered to assure a minimum amount of the rock-back shock given to the vehicle driver/passenger upon stopping of the vehicle.

Figure 16:
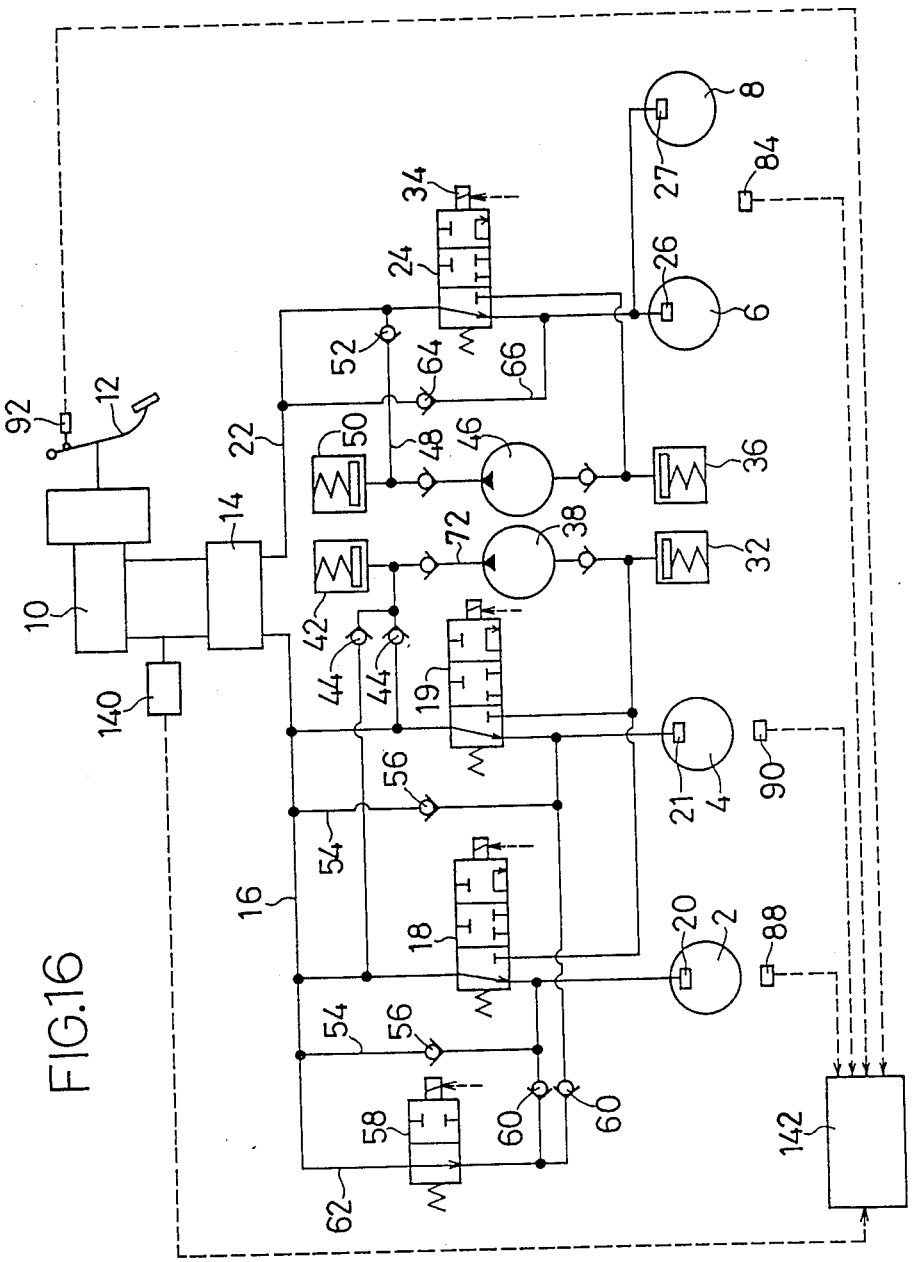
FIG. 16 is a hydraulic circuit diagram showing a fourth embodiment of the hydraulically operating braking system of the invention.
Figure 17:
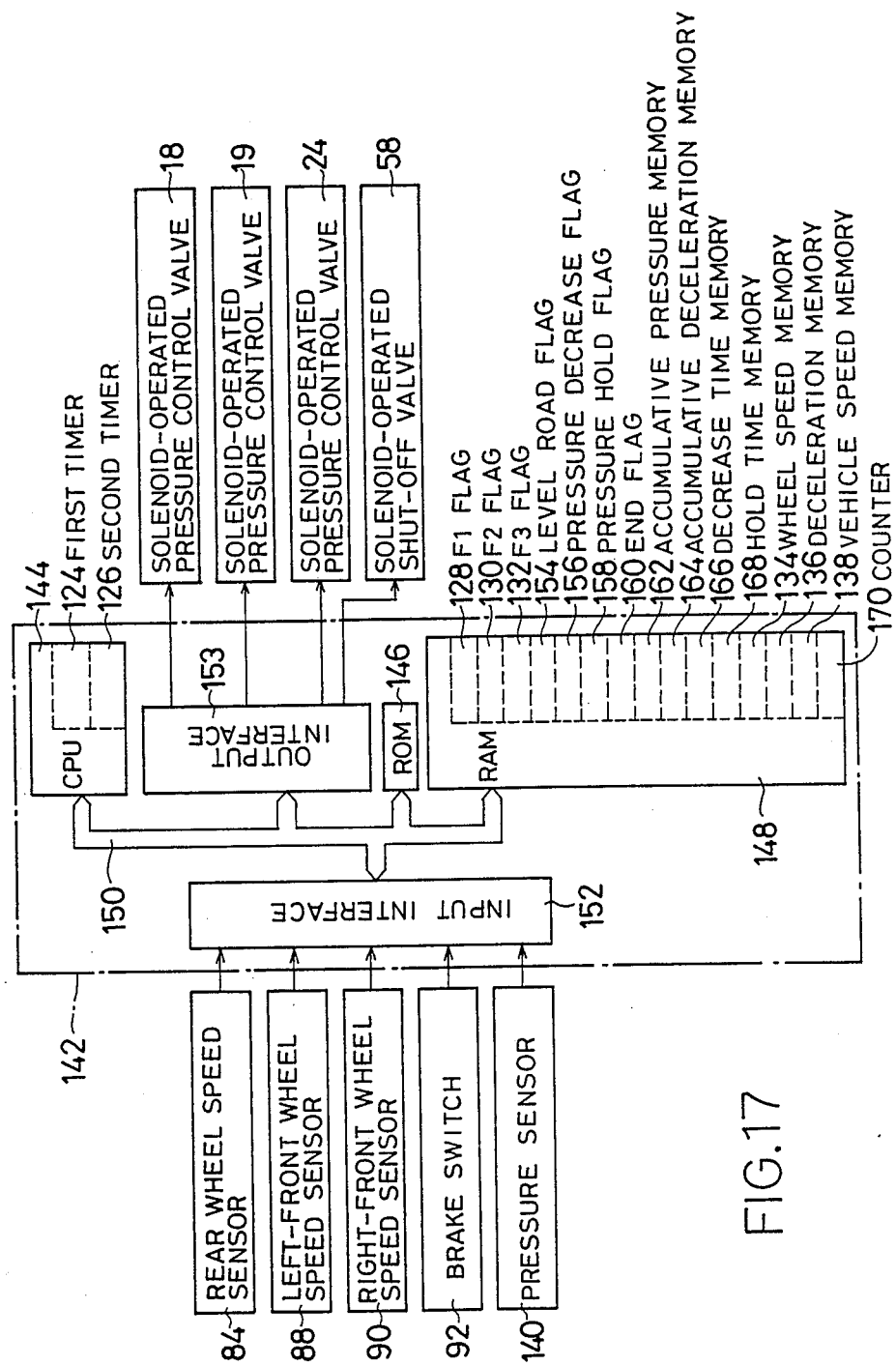
FIG. 17 is a block diagram showing a control arrangement for the braking system of FIG. 16.

Referring next to FIGS. 16 and 17, a fourth embodiment of the present invention will be described. The hydraulic arrangement of the present embodiment as shown in FIG. 16 is identical with that of the first embodiment of FIG. 1, except that a pressure sensor 140 is provided to detect the pressures in the master cylinder 12 and the front wheel cylinders 20, 21. The same reference numerals as used in FIG. 10 are used to identify the corresponding components, which will not be described in the interest of brevity and simplification.

The pressure sensor 140 is connected to an input interface 152 of a computer 142 shown in FIG. 17. The computer 142 includes a CPU 144, a ROM 146, a RAM 148, a bus 150, an output interface 153 and the above-indcated input interface 152. The CPU 144 incorporates the first and second timers 124, 124 as used in the third embodiment of FIGS. 10 and 11. The RAM 148 incorporates the F1, F2, F3 flags 128, 130, 132, WHEEL SPEED memory 134, DECELERATION memory 136 and VEHICLE SPEED memory 138, which are provided in the RAM 116 of the third embodiment. The RAM 148 further incorporates: a LEVEL ROAD flag 154; a PRESSURE DECREASE flag 156; a PRESSURE HOLD flag 158; an END flag 160; an ACCUMULATIVE PRESSURE memory 162; an ACCUMULATIVE DECELERATION memory 164; a DECREASE TIME memory 166; a HOLD TIME memory 168; and a counter 170. The functions of these flags, memories and counter will become apparent from the following description.

Figure 20A:
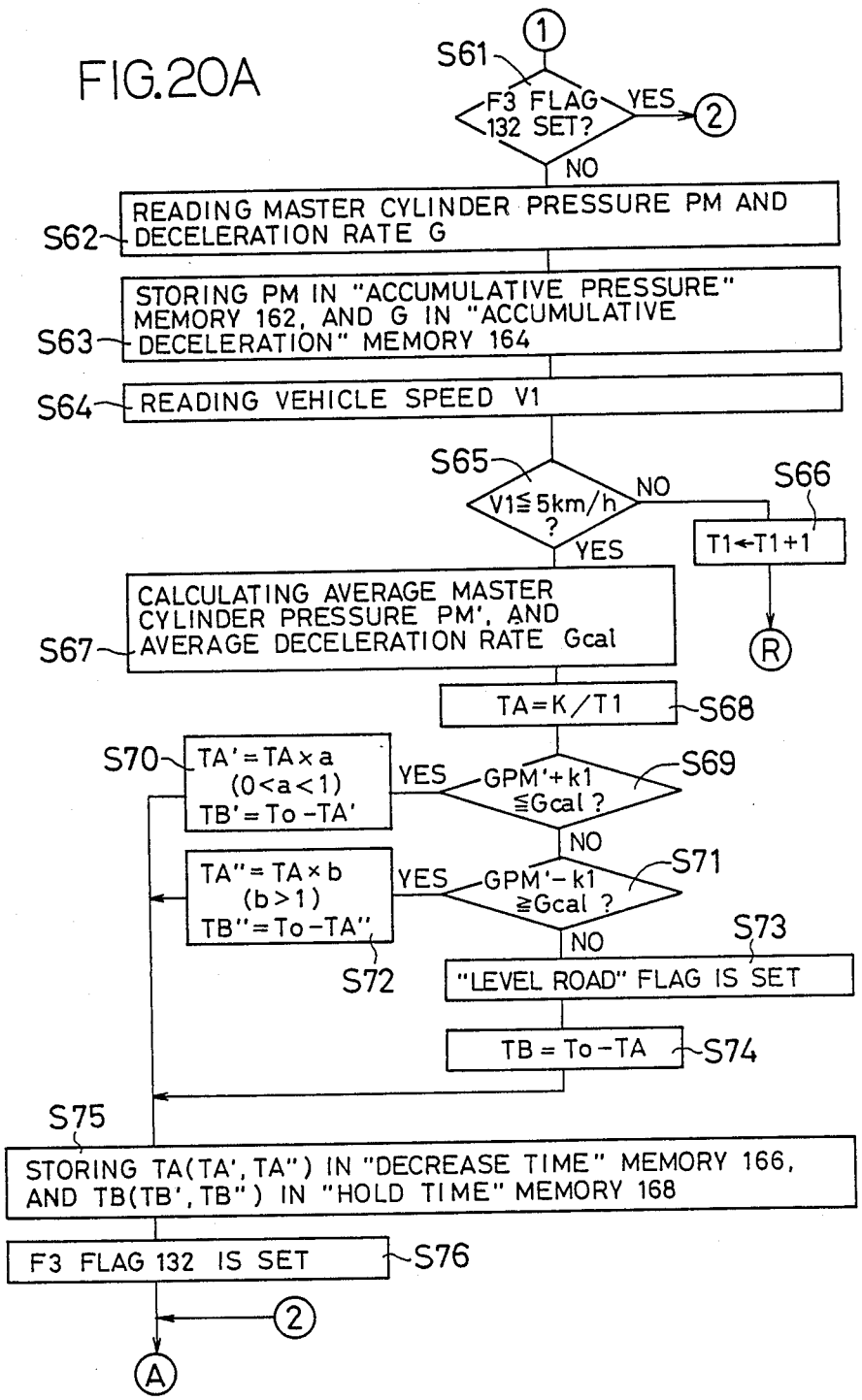
Figure 20B:
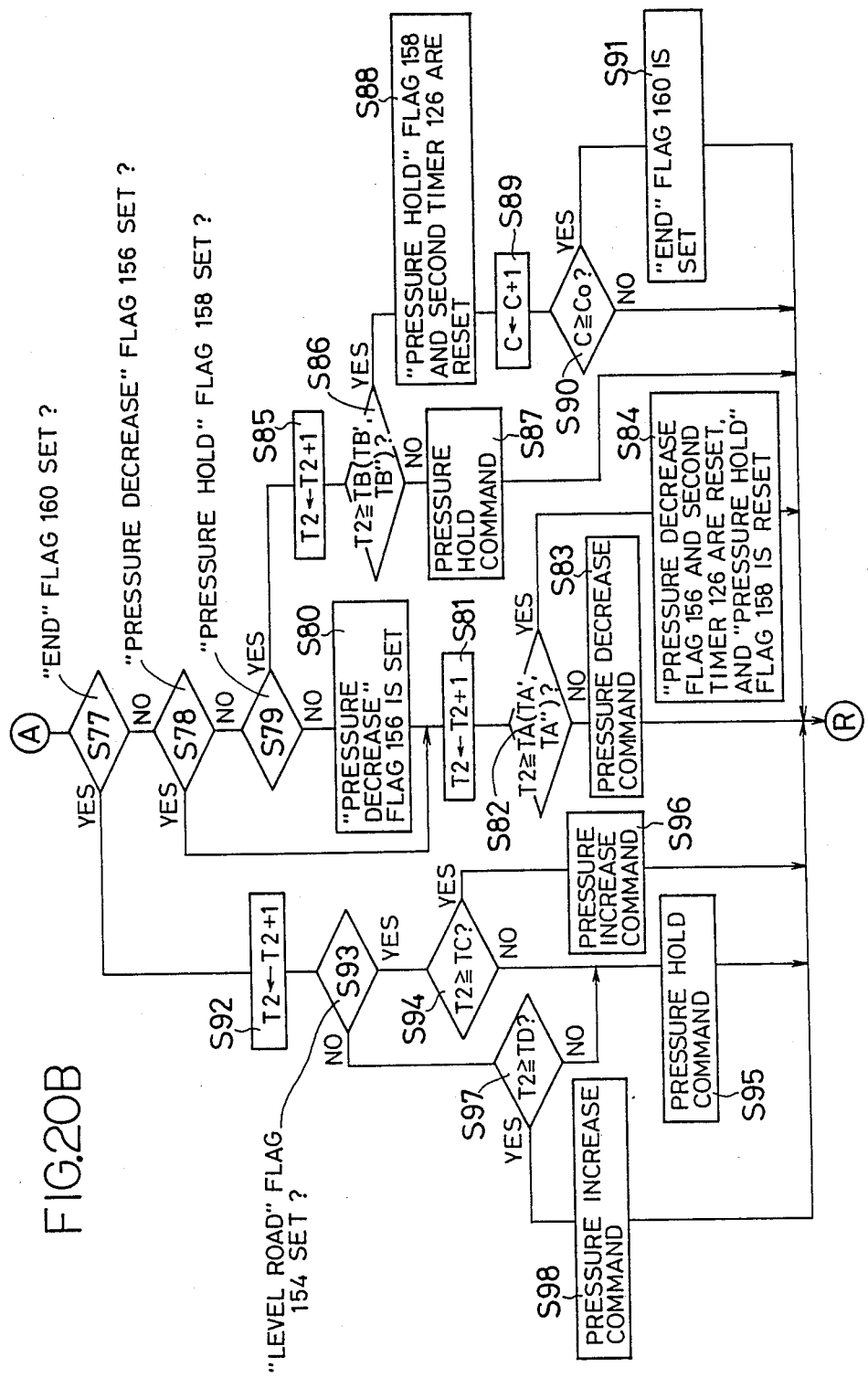

The ROM 146 stores various control programs which include a main control routine as shown in FIG. 18, an anti-lock brake control routine as shown in FIG. 19, and an anti-rock-back brake control routine as shown in FIG. 20. The main control routine of FIG. 18 is identical with the main control routine of FIG. 12 of the third embodiment, except for steps S21' and S28' wherein the flags 154, 156, 158 and 160, memories 162, 164, counter 168, etc. are reset, as well as the first and second timers 124, 126 and flags 128, 130, 132.

In the instant embodiment, the anti-lock brake control operation is performed according to the anti-lock brake control routine of FIG. 19, which corresponds to steps S31–S40 of the anti-lock and anti-rock-back brake control routine of FIG. 13. Accordingly, the same step numbers as used in FIG. 13 are used in FIG. 19, to identify the same steps. Namely, the anti-lock brake control operation is performed in the same manner as in the third embodiment.

When the F1 flag is set after the vehicle speed V1 has been lowered down to 10 km/h, an affirmative decision (YES) is obtained in step S40 of the anti-lock brake control routine of FIG. 19, and the control flow goes to step S61 of the anti-rock-back brake control routine of FIG. 20, to initiate the anti-rock-back brake control operation, as described below.

In step S61, the CPU 144 determines whether the F3 flag 132 is in the set state or not. Initially, this flag 132 is in the reset state, and a negative decision (NO) is obtained. Accordingly, step S61 is followed by step S62 in which the CPU 142 reads a presure PM in the master cylinder 12 which is detected by the pressure sensor 140, and a deceleration rate G of the vehicle which is stored in the DECELERATION memory 136. The deceleration rate G is not influenced by an angle of inclination of the vehicle in a plane parallel to the running direction. Then, the control flow goes to step S63 in which the currently detected master cylinder pressure PM and the currently retrieved deceleration rate G are stored in the ACCUMULATIVE PRESSURE and ACCUMULATIVE DECELERATION memories 162, 164, respectively. These memories 162, 164 store successively entered values of the master cylinder pressure PM and deceleration rate G such that the values are summed one after another. Then, the control flow goes to step S64 in which the CPU 144 reads the vehicle speed V1, and step S65 to determine whether the vehicle speed V1 is equal to or lower than 5 km/h. Since the vehicle speed V1 is initially higher than 5 km/h, a negative decision (NO) is obtained in step S65, and step S66 is implemented to increment the count T1 of the first timer 124, and the control flow returns to the main control routine of FIG. 18. Thereafter, steps S31–S33, S40, S61–S66 are repeatedly executed until an affirmative decision is obtained in step S65. The function of the first timer 124 has been described above, in connection with the third embodiment of FIGS. 10 and 11.

When the vehicle speed V1 has been lowered down to 5 km/h, step S67 is executed to calculate an average master cylinder pressure PM', and an average deceleration rate Gcal of the vehicle, which were established while the vehicle speed V1 was lowered from 10 km/h to 5 km/h. The average deceleration rate Gcal can be obtained from the content of the DECELERATION memory 136 and the count T1 of the first timer 124. Then, the control flow goes to step S68 to calculate the pressure-decrease time TA by dividing a constant K by the count T1, as described above in connection with step S5 of FIG. 6 of the first embodiment of FIGS. 1 and 2, and step S45 of FIG. 13 of the third embodiment of FIGS. 10 and 11. As in the first embodiment, the wheel cylinder pressure (pressure in the left front wheel cylinder 20 in this specific example) is lowered in several steps. Namely, the pressure-decrease cycle is repeated several times (Co), the cycle time To consisting of the pressure-decrease time TA and a pressure-hold time. The cycle time To and the number Co of the pressure-decrease cycles are constant, irrespective of the specific vehicle deceleration rate G before the anti-rock-back brake control operation is started. The cycle time To and the cycle number Co are stored in the ROM 146.

The manner in which the constant K is determined, and the meaning of the pressure-decrease time TA in relation to the time T1 (count T1 which relates to the average deceleration rate G') have been described above.

Step S68 is followed by step S69 in which a reference deceleration rate GPM' corresponding to the average master cylinder pressure PM' is obtained from a data table (stored in the ROM 148) which represents a relationship between the vehicle deceleration rate and the master cylinder pressure. This reference deceleration rate GPM' is a rate of deceleration of the vehicle with the pressure in the left front wheel cylinder 20. IN step S69, a sum of the reference deceleration rate GPM' and an error k1 is compared with the actual average deceleration rate Gcal. If the average deceleration rate Gcal is larger than the sum of GPM' and k1, this indicates that the vehicle is currently running on an uphill. While the vehicle is running on the uphill, the slope tends to decelerate the vehicle, and the average deceleration rate Gcal (actual deceleration rate) tends to be larger than the reference deceleration rate GPM' which is to be established with the brake pedal 10 operated while the vehicle is running on a level road. Thus, an affirmative decision (YES) is obtained in step S69 if the vehicle is running on an uphill. In this case, step S69 is folowed by step S70 in which a pressure-decrease time TA' and a pressure-hold time TB' for the uphill running are calculated.

Figure 21:
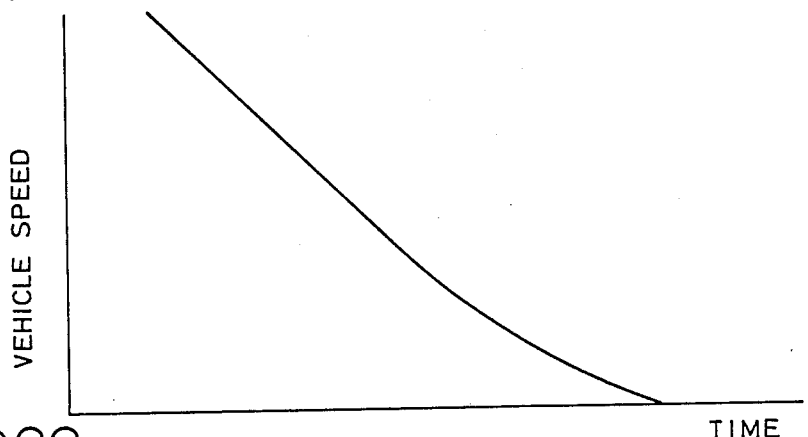
FIG. 21 is a graph showing the vehicle speed varying with time, during an anti-rock-back brake control operation according to the fourth embodiment of FIGS. 16 and 17.

While the vehicle is running on a level road, the vehicle can be stopped with a minimum rock-back motion of the vehicle driver/passenger, with the wheel cylinder pressure lowered as indicated in FIG. 21, if the anti-rock-back brake control operation is accomplished with the pressure-decrease time TA as calculated in step S68 and a pressure-hold time TB as calculated in step S74 (which will be described). While the vehicle is running on an uphill, however, the count T1 cf the first timer 124 obtained during the uphill running of the vehicle becomes smaller than that obtained during the level road running, provided the wheel cylinder pressure is the same. Therefore, the pressure-decrease time TA durning the uphill running becomes longer than that during the level road running. Accordingly, the pressure-decrease time TA for the uphill running should be shortened in order to stop the vehicle on the uphill road with a minimum rock-back motion as in the case of the level road running. To this end, the pressure-decrease time TA' for the uphill running is calculated in step S70, by multiplying the time TA by a constant "a" which is larger than 0 but smaller than 1. The pressure-hold time TB' is calculated in step S74, by subtracting the pressure-decrease time TA' from the cycle time To (To=TA'+TB').

On the other hand, while the vehicle is running on a downhill, a negative decision (NO) is obtained in step S69, and step S71 is executed to compare the value GPM'−k1 with the average deceleration rate Gcal. If the average deceleration rate Gcal is smaller than the value GPM'−k1, this means that the vehicle is running on a downhill. In this case, the slope tends to accelerate the vehicle, and thereby reduce the deceleration rate, whereby the average deceleration rate Gcal becomes smaller than the reference deceleration rate GPM' which is to be obtained during the level road running. If an affirmative decision is obtained in step S71, step S72 is executed to calculate a pressure-decrease time TA" and a pressure-hold time TB" for the downhill running. Since the count T1 during the downhill running becomes larger than that during the level road running, the pressure-decrease time TA tends to be shorter during the downhill running. Therefore, the pressure-decrease time TA" should be determined longer than the time TA. To this end, the pressure-decrease time TA" is calculated in step S72, by multiplying the time TA by a constant "b" which is larger than 1, and the pressure-hold time TB" is calculated by subtracting the pressure-decrease time TA" from the cycle time To.

While the vehicle is running on a level road, the average deceleration rate Gcal is equal to the reference deceleration rate GPM', and a negative decision (NO) is obtained in steps S69 and S71, whereby step S73 is implemented to set the LEVEL ROAD flag 154. In this case, the pressure-decrease time TA as calculated in step S68 can be used to effect the anti-rock-back brake control operation. In the next step S74, the pressure-hold time TB is calculated from the cycle time To and the pressure-decrease time TA.

The pressure-decrease times TA, TA' and TA", and the pressure-hold times TB, TB' and TB", which are determined depending upon the road condition (uphill, downhill or level road), are stored in step S75, in the appropriate DECREASE TIME and HOLD TIME memories 166, 168. Step S75 is followed by step S76 wherein the F3 flag 132 is set. Then, step S77 and subsequent steps are performed to lower the wheel cylinder pressure. By way of example, the following description relates to the anti-rock-back brake control operation where the vehicle is running down a slope. In this case, the command signals are applied to the solenoid-operated pressure control valve 18, as indicated in dashed line in FIG. 23 (the dashed line partially overlapping solid line which indicates the signals generated where the vehicle is running on a level road). Further, the change in the wheel cylinder pressure is indicated in dashed line in FIG. 22.

Initially, step S77 is executed to determine whether the END flag 160 is in the set state or not. Since this flag 160 is reset in the initialization step S21' of the main control routine of FIG. 18, a negative decision (NO) is obtained, and step S78 is implemented to determine whether the PRESSURE DECREASE flag 156 is in the set state or not. Since this flag 156 is also reset in the initialization step S21', a negative decision (NO) is obtained in the first execution of step S78. Similarly, a negative decision (NO) is obtained in the next step S79, since the PRESSURE HOLD flag 158 is initially reset. Then, the control flow goes to step S80 to set the PRESSURE DECREASE flag 156, and to step S81 to increment the count T2 of the second timer 126. Then, step S82 is executed to determine whether the count T2 is equal to or larger than the pressure-decrease time TA". Initially, a negative decision (NO) is obtained in step S82, and a pressure decrease command is generated in step S83, which command is applied to the pressure control valve 18, to place the valve 18 in its pressure-decrease position. As a result, the wheel cylinder pressure is lowered as indicated in dashed line in FIG. 22.

When step S61 is executed in the second control cycle, an affirmative decision (YES) is obtained, and step S61 is followed by step S77, with steps S62–S76 being skipped. In this second control cycle, a negative decision (NO) is obtained in step S77, and an affirmative decision (YES) is obtained in step S78. Steps S79 and S80 are skipped, and steps S81 and S82 are executed. Thereafter, steps S31–S33, S40, S61, S77, S78 and S81–S83 are repeatedly executed until the wheel cylinder pressure has been lowered for the pressure-decrease time TA". When this time TA" has elapsed, an affirmative decision (YES) is obtained in step S82, and step S84 is executed to reset the PRESSURE DECREASE flag 156 and second timer 126, and set the PRESSURE HOLD flag 158. Then, the control flow goes back to the main control routine.

While a negative decision (NO) is obtained in the next execution of step S78, an affirmative decsion (YES) is obtained in the next step S79, and the control flow goes to step S85 to increment the count T2, and step S86 to determine whether the count T2 is equal to or larger than the pressure-decrease time TB". In an initial period of the anti-rock-back brake control operation, a negative decision (NO) is made in step S86, and step S87 is executed wherein a pressure hold command is applied to the pressure control valve 18, to switch the valve 18 to its pressure-hold position, whereby the lowered pressure in the wheel cylinder 20 is maintained for the pressure-decrease time TB", that is, until an affirmative decision (YES) is obtained in step S86. Namely, steps S31–S33, S40, S61, S77–S79 and S85–S87 are repeatedly executed until the time TB" has elapsed. Then, step S88 is executed to reset the PRESSURE HOLD flag 158 and second timer 126. Step S88 is followed by step S89 in which a count C of the counter 170 is incremented. This counter 170 is provided to count the number of the pressure-decrease cycles (number of pressure-decrease steps), and therefore a negative decision (NO) is obtained in step S90 in an initial period of the anti-rock-back brake control operation. Consequently, the control flow returns to the main control routine, and the next pressure-decrease cycle is performed, in the manner as described above. When the pressure-decrease cycle is repeated the predetermined times Co, an affirmative decision (YES) is obtained in step S90, and step S91 is implemented to set the END flag 160.

Figure 22:
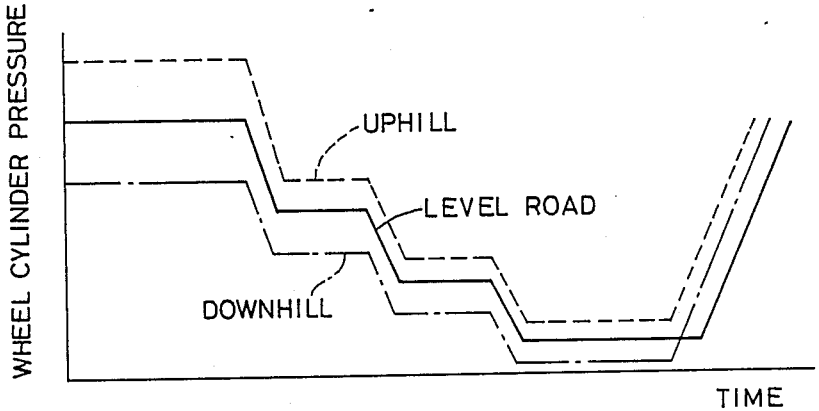
FIG. 22 is a graph showing the wheel cylinder pressure varying with time, during the anti-rock-back brake control operation according to the fourth embodiment.
Figure 23:
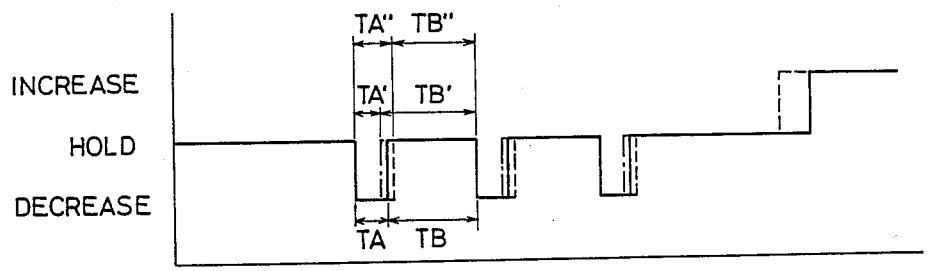
FIG. 23 is a time chart indicating pressure control signals generated during the anti-rock-back brake control operation according to the fourth embodiment.

With the anti-rock-back brake control operation performed with the pressure-decrease cycle repeated the predetermined number Co, the pressure in the left front wheel cylinder 20 is lowered in steps, as indicated in dashed line in FIG. 22, and the vehicle is smoothly decelerated as indicated in FIG. 21, with a considerably small amount of a rock-back motion of the vehicle driver/passenger, as if the vehicle were running on a level road. That is, the above-described anti-rock-back brake control operation for the downhill running does not suffer from a delay in lowering the wheel cylinder pressure, and thus assures a sufficiently reduced amount of the rock-back motion, even when the brake is applied during running of the vehicle on the downhill road. As indicated in FIG. 22, the wheel cylinder pressure is not completely zeroed at the end of the pressure decreasing operation, since a residual pressure makes the vehicle driver feel easy, recognizing that the brake is still in effect. Where the vehicle is running down a slope, the residual wheel cylinder pressure is relatively high, as indicated in FIG. 22, because the wheel cylinder pressure at which the anti-rock-back brake control operation is initiated is higher, than in the case of the level road running.

Where the vehicle is running up a slope, the anti-rock-back brake control operation is performed with the pressure-decrease time TA' and pressure-hold time TB', and the vehicle can be decelerated and stopped with the predetermined braking distance and a minimum rock-back motion of the vehicle drive/passenger, as in the case of the level road running.

After the last pressure decrease is completed, the solenoid-operated pressure control valve 18 is held in the pressure-hold condition for a predetermined time, and then switched to the pressure-increase position in order to hold the vehicle at the stopped condition. The pressure-hold time following the last pressure decrease is shorter in the case of the downhill or uphill runing, than in the case of the level road running. More specifically, the vehicle can be held in the stopped position, with a relatively low pressure in the wheel cylinder, if the road is almost level. However, the vehicle tends to be moved from the stopped position on the uphill or downhill, and therefore the wheel cylinder pressure is increased at an earlier point of time in the case of the uphill or downhill running, than in the case of the level road running.

When the END flag 160 is set in step S91, an affirmative decision (YES) is obtained in the next execution of step S77, and the control flow goes to step S92 to increment the count T2 of the second timer 126. Then, step S93 is executed to determine whether the LEVEL ROAD flag 154 is in the set state or not. If the vehicle is running on a level road, step S94 is executed to determine whether the count T2 reaches a value Tc which is determined for the level road running. Namely, the CPU 142 checks if the predetermined time Tc for the level road running has elapsed or not. In an initial period after the execution of step S77, a negative decision (NO) is obtained in step S94, and step S95 is executed to generate a pressure hold command so that the pressure in the wheel cylinder 20 is maintained. When the time Tc has elasped, an affirmative decision (YES) is obtained in step S94, and the control flow goes to step S96 in which a pressure increase command is generated to increase the wheel cylinder pressure. Then, the control flow returns to the main control routine.

Where the vehicle is running on an uphill or downhill, step S97 is executed to check if a predetermined time Td has elapsed. Initially, a negative decision (NO) is obtained in step S97, and the pressure hold command is generated in step S95, whereby the wheel cylinder pressure is maintained. When the time Td has elapsed, an affirmative decision (YES) is obtained in step S97, and the pressure increase command is generated in step S98, whereby the wheel cylinder pressure is increased. Then, the control flow returns to the main control routine.

Where the vehicle is running on a level road, an affirmative decision (YES) is obtained in step S77 after the pressure-increase command is generated, until the brake pedal 10 is released. During this period, step S92 is executed, and an affrmative decision (YES) is obtained in steps S93 and S94. Accordingly, step S96 is executed to hold the pressure control valve 18 in the pressure-hold position. Thus, the wheel cylinder pressure is continuously increased. Where the vehicle is running on an uphill or downhill, a negative decision (NO) is obtained in step S93, and an affirmative decision (YES) is obtained in step S97, whereby step S98 is executed. Thus, the wheel cylinder pressure is continuously increased.

As is apparent from the foregoing description, the speed sensors 84, 88, 90, and the computer 142 constitute means for detecting the running speed of the vehicle and means for detecting the deceleration rate of the vehicle. Further, the pressure sensor 140, portions of the ROM 146 and CPU 142 assigned to execute steps S62–S67, S69 and S71, ACCUMULATIVE PRESSURE and ACCUMULATIVE DECELERATION memories 162, 164, DECELERATION and VEHICLE SPEED memories 136, 138, and first timer 124 substantially constitute means for detecting a pressure in the master cylinder 12 and consequently a pressure in the wheel cylinders, means for detecting the vehicle deceleration rate, and means for determining whether a road on which the vehicle is running is sloped or level. The solenoid-operated pressure control valves 18, 19, 24, portions of the ROM 146 and CPU 144 assigned to execute steps S77–S98, second timer 126, PRESSURE DECREASE and PRESSURE HOLD flags 156, 158, DECREASE TIME and HOLD TIME memories 166, 168, and counter 170 substantially constitute stop control means for effecting an anti-rock-back brake control operation to lower the fluid pressures in the wheel cylinders when the detected speed of the vehicle falls below a predetermined reference value.

Figure 24:
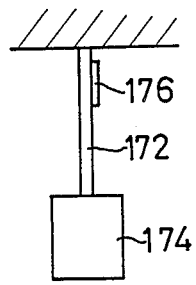
FIG. 24 is an illustration showing a deceleration sensor which uses a weight suspended on the vehicle.

While the slope determining means in the above embodiment uses the master cylinder pressure sensor 140, the slope (uphill or downhill) may be determined by utilizing an inertia of a weight suspended on the vehicle, when the vehicle is decelerated. Described more specifically, the deceleration rate of the vehicle detected by the suspended weight is influenced by a slope of the road surface, that is, by an inclination of the vehicle in a plane parallel to the running direction. An example of a deceleration sensor using a weight is illustrated in FIG. 24. In this sensor, a cantilever 172 made of a resilient material is fixed at its upper end to the body of the vehicle A weight 174 is fixed to the lower end of the cantilever 172. A flexure of the cantilever 172 due to inertia of the weight 174 during deceleration of the vehicle is detected by a strain gage 176. When the vehicle is at rest on a level road, no flexure of the cantilever 172 takes place. On a downhill road, for example, the cantilever 172 is flexed in a direction that causes the vehicle deceleration rate detected by the strain gage 176, to be higher than the actually detected average deceleration rate Gcal (which is not influenced by the inclination of the vehicle). On an uphill road, the deceration rate detected by the strain gage 176 tends to be lower than the actually detected deceleration rate Gcal. Accordingly, the use of the suspended weight permits determination of the slope, by comparing the deceleration rate Gcal with the deceleration rate detected by the weight, in the same manner as in the case of utilizing the master cylinder pressure wherein the deceleration rate Gcal is compared with the reference rate GPM' which is predetermined in relation to the master cylinder pressure during running of the vehicle on a level road. The slope determination by utilizing the weight can be made by executing a program similar to that shown in the flow chart of FIG. 20. In this case, the speed sensors 84, 88, 90 and computer 142 constitute the first deceleration detecting means for detecting the vehicle deceleration rate, without an influence by the inclination of the vehicle or by the gradient of the road surface, while the detecting arrangement using the suspended weight constitutes second deceleration detecting means for detecting the deceleration rate which is influenced by the gradient of the road surface.

In the above embodiment, the number Co of anti-rock-back brake control cycles (number of pressure-decrease steps) and the cycle time To are constant irrespective of the actual deceleration rate of the vehicle detected prior to the initiation of the anti-rock-back brake control operation. However, these number and time may be changed with the deceleration rate.

Although the determination of the road slope is effected based on the vehicle deceleration rate, other parameters may be used to determine the road slope.

Figure 25:
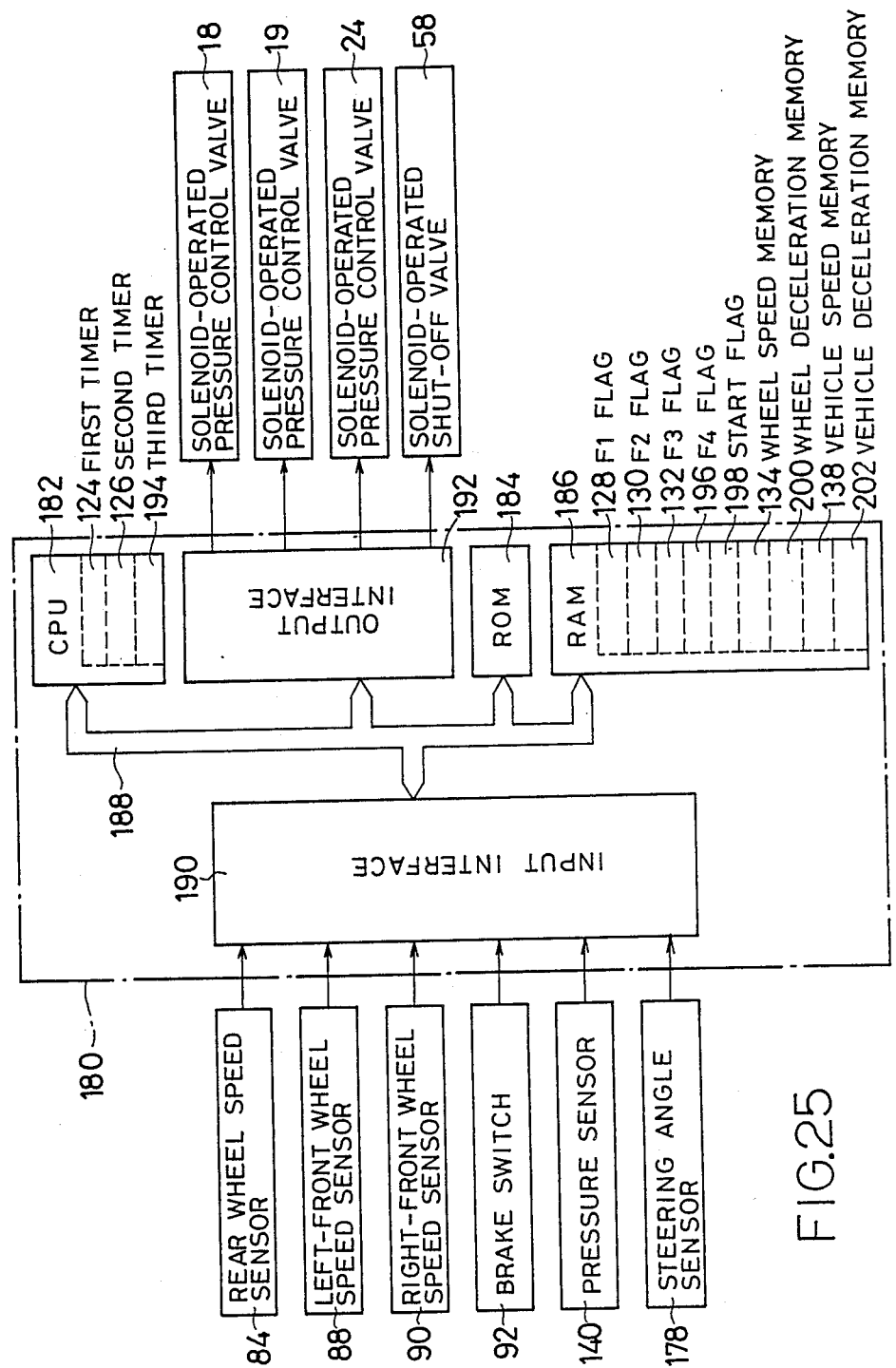
FIG. 25 is a block diagram showing a control arrangement of the braking system according a fifth embodiment of the invention.

Referring next to FIG. 25, a control arrangement of a fifth embodiment of the braking system of the invention is illustrated. The hydraulic arrangement of this braking system is identical with that of the fourth embodiment shown in FIG. 16. The control arrangement of the instant embodiment uses a steering angle sensor 178 to detect an angle $\theta$ of rotation of a steering wheel of the vehicle, and a computer 180 which includes a CPU 182, a rom 184, a RAM 186, a bus 188, an input interface 190 and an output interface 192. The input interface 190 is adapted to receive a signal from the steering angle sensor 178, as well as the signals from the wheel speed sensors 84, 88, 90, brake switch 92, and master cylinder pressure sensor 140, which have been described. The output interface 192 applies control signals to the pressure control valves 18, 19, 24 and shut-off valve 58, as described above with respect to the preceding embodiments.

The CPU 182 incorporates a third timer 194 (which will be described) as well as the first and second timers 124, 126, and the RAM 186 incorporates an F4 flag 196, a START flag 198, a WHEEL DECELERATION memory 200 and a VEHICLE DCECELERATION memory 202, as well as the F1–F3 flags 128, 130, 132, WHEEL SPEED memory 134 and VEHICLE SPEED memory 138.

Figure 26:
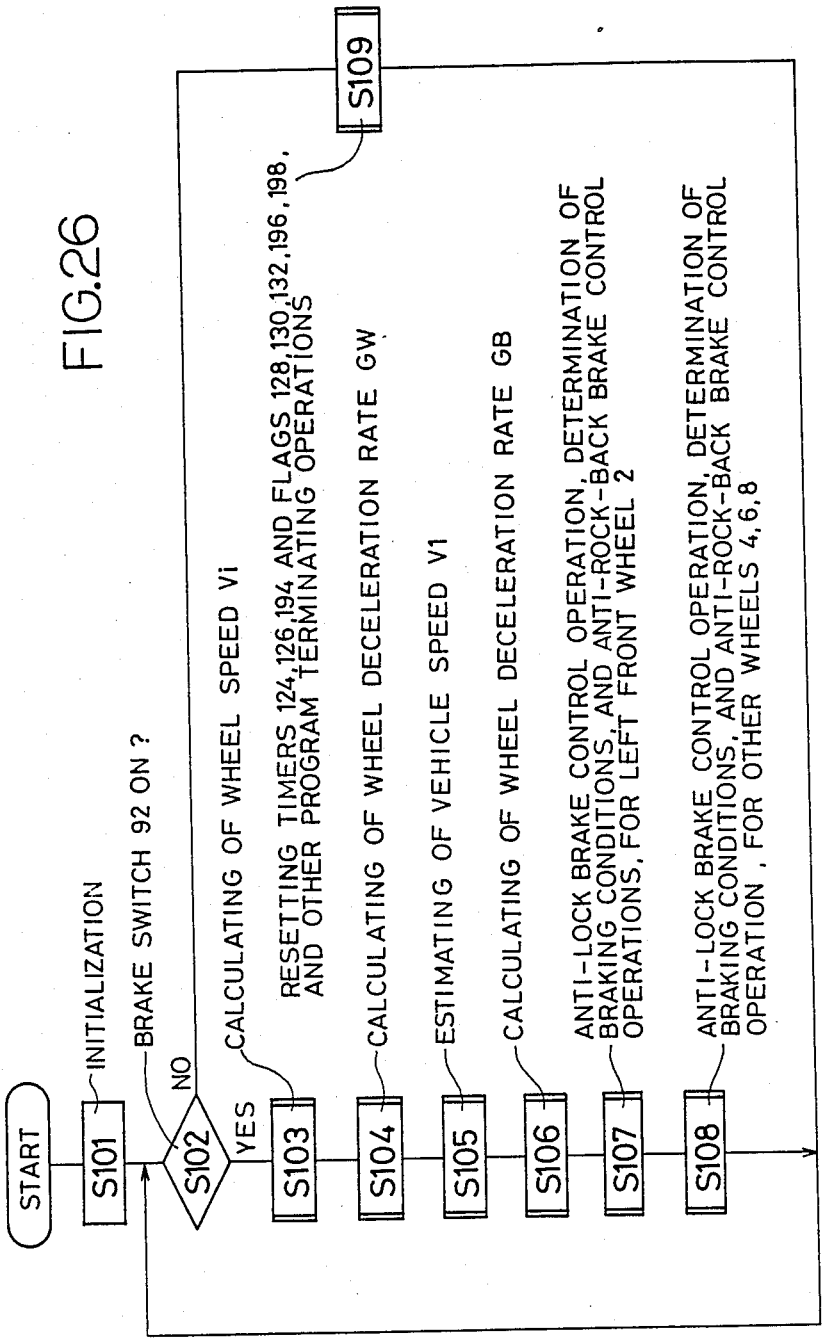

In the present embodiment, the main control routine illustrated in the flow chart of FIG. 26 is different from the main control routine of FIG. 18 of the fourth embodiment, in connection with steps S101, S106, S107, S108 and S109. Steps S102–S105 correspond to steps S22–S25 of the flow chart of FIG. 18. In steps S101 and S109, the timers 124, 126, 194, flags 128, 130, 132, 196, 198, and memories 134, 138, 200, 202 are reset. Step S106 is additionally executed to calculate the deceleration rate GB of the vehicle, and store the calculated vehicle deceleration rate GB in the VEHICLE DECELERATION memory 202. It is noted that the wheel deceleration rate GW is stored in the WHEEL DECELERATION memory 200. In steps 107 and S108, the braking conditions are determined, as well as the anti-lock and anti-rock-back brake control operations are performed for the respective wheels 2, 4, 6, 8. As described below, the instant embodiment is charcterized by the determination of the braking conditions prior to starting the anti-rock-back brake control operation.

Figure 27:
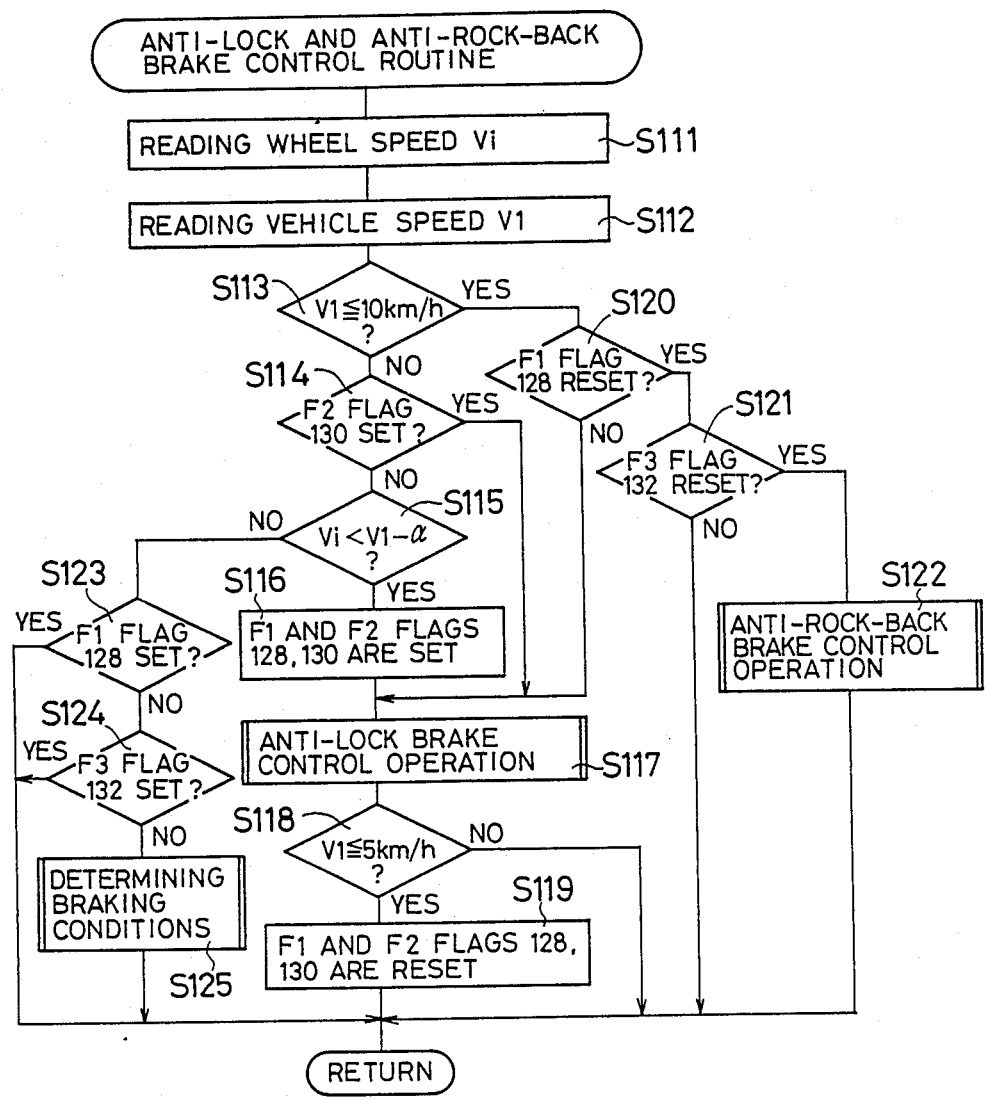

The brake control operations for the left front wheel 2 in the present embodiment will be described in detail, by reference to the flow charts of FIGS. 27 and 28, by way of example. It is noted that the description of the F1–F3 flags 128, 130, 132 provided with respect to the third and fourth embodiments of FIGS. 10–11 and 16–17 is also applicable to the present embodiment.

Initially, the control flow goes to step S111 wherein the wheel speed Vi is read out from the WHEEL SPEED memory 134. Step S111 is followed by step S112 in which the vehicle speed V1 is read out from the VEHICLE SPEED memory 138. Then, the control flow goes to step S113 to determine whether the vehicle speed V1 is equal to or lower than 10 km/h, or not. If the vehicle speed V1 is higher than 10 km/h, a negative decision (NO) is obtained in step S113, and step S114 is executed to determine whether the F2 flag 130 is in the set state, or not. Since the F2 flag 130 is initially reset, a negative decision (NO) is made in the first execution of step S114, and step S115 is executed to determine whether the wheel speed Vi is lower than the vehicle speed V1 minus a predetermined value $\alpha$. If an affirmative decision (YES) is obtained in step S115, this indicates that the braking force exerted to the left front wheel 2 is excessively large in relation to the friction coefficient of the road surface, causing the wheel 2 to slip on the road surface. In this case, therefore, the pressure in the wheel cylinder 20 for the wheel 2 should be controlled in an anti-lock fashion. Accordingly, the control flow goes to step S116 to set the F1 and F2 flags 128, 130, and then to step S117 to initiate an anti-lock brake control operation for the left front wheel 2. Since the solenoid-operated pressure control valve 18 is placed in the pressure-increase position upon starting of the brake application, the pressure control valve 18 is first switched to the pressure-decrease position in step S117, in order to lower the pressure in the wheel cylinder 20, for removing the locking condition of the wheel 2.

Then, the control flow goes to step S118 to determine whether the vehicle speed V1 is equal to or lower than 5 km/h, or not. During an initial period after the start of the anti-lock brake control operation, the vehicle speed V1 is usually higher than 5 km/h, and a negative decision (NO) is obtained in step S118. Thus, the above-indicted subroutine is completed. Once the anti-lock brake control operation is initiated, an affirmative decision (YES) is obtained in the next execution of step S114, whereby steps S115 and S116 are skipped, and step S117 is executed. In step S117, the pressure in the wheel cylinder 10 is suitably controlled depending upon the amount of slip of the left front wheel 2. More particularly, the pressure control valve 18 is kept in the pressure-decrease position or pressure-hold position if the amount of slip is excessive. When the slip amount is reduced to a permissible level, then the control valve 18 is switched to the pressure-increase position. Thus, the braking pressure in the wheel cylinder 20 is held within an optimum range, to keep the slip amount of the wheel 2 within an optimum range.

Where the vehicle speed V1 is lowered to 10 km/h during the anti-lock brake control operation, an affirmative decision (YES) is obtained in step S113, and a negative decision (NO) is obtained in step S120. Accordingly, the anti-lock brake control operation is continued. Once the anti-lock operation is initiated, an anti-rock-back brake control operation in step S122 will not be implemented, even after the vehicle speed V1 is lowered down to 10 km/h. As described previously with respect to the fourth embodiment, if an anti-lock brake control operation is performed for any one of the wheels 2, 4, 6, 8, an anti-rock-back brake control operation will not be performed for the other wheels, either. When the vehicle speed V1 is lowered to 5 km/h, an affirmative decision is obtained in step S118, and step S119 is implemented to reset the F1 and F2 flags 128, 130, and the control flow returns to the main control routine. That is, the anti-lock brake control operation will not be performed after the vehicle speed is lowered to 5 km/h.

If the wheel speed Vi is equal to or higher than the vehicle speed V1 minus the predetermined value α, the anti-lock brake control operation in step S117 will not be effected, but the braking conditions are checked in step S125. In this case, a negative decision is obtained in step S115, and step S123 is implemented to determine whether the F1 flag 128 is in the set state or not. Since an anti-rock-back brake control operation will not be performed if an anti-lock brake control operation has been initiated for any wheel, it is not necessary to determine or check the braking conditions, in order to determine whehter the anti-rock-back brake control operation for the left front wheel 2 should be inhibited or not. In view of this, the determination as to whether the F1 flat 128 is in the set state is implemented in step S123. In other words, an affirmative decision (YES) is obtained in step S123 if an anti-lock brake control operation is being effected for any one of the wheels 2, 4, 6, 8. If the anti-lock operation is performed for none of the wheels, then a negative decision (NO) is obtained in step S123, and step S124 is implemented to check if the F3 flag 132 is in the set state or not. This F3 flag is set when it is determined that the brake currently applied is an emergency brake, as described below. Since the F3 flag 132 is common to all the wheels, a negative decision (NO) is obtained in step S124 if it is determined that the brake currently applied to any wheel is an emergency brake. Namely, the determination of the braking conditions in step S125 to avoid an anti-rock-back brake control operation upon application of an emergency brake will not be effected, until the relevant emergency brake application is terminated.

By reference to the flow chart of FIG. 28, there will next be described the determination of the braking conditions to determine an emergency brake.

In the braking condition determination routine of FIG. 28, the control flow first goes to step S131 to read an angle θ of rotation of the steering wheel, and the vehicle speed V1. Step S131 is followed by step S132 in which an acceleration rate Gs in the transverse direction of the vehicle (perpendicular to the running direction) is calculated based on the angle θ and speed V1. Then, the control flow goes to step S132 to determine whether the calculated transverse acceleration rate Gs is equal to or higher than a predetermined reference value Gsk. If the transverse acceleration rate Gs is equal to or higher than the reference value Gsk, this indicates that the relevant brake was applied for some emergency purpose. Described more specifically, the transverse acceleration rate of the vehicle represents a turning movement of the vehicle. Usually, a braking action by the driver to normally decelerate or smoothly stop the vehicle will not take place while the transverse acceleration rate Gs is considerably high. If a brake is applied while the transverse acceleration rate is high, this brake is intended to slow down or stop the vehicle in order to follow a sharp curve of the road or to avoid a collision with an obstacle, or for other emergency purposes. In this situation, an anti-rock-back brake control operation is not desirable. Therefore, if the transverse acceleration rate Gs is equal to or higher than the reference value Gsk, step S133 is followed by step S143 to set the F3 flag 132 for avoiding the execution of the anti-rock-back brake control operation in step S122 of FIG. 27 (which is illustrated in detail in FIG. 29). Then, the control flow returns to the main control routine.

If the transverse acceleration rate Gs of the vehicle is lower than the reference value Gsk, a negative decision (NO) is obtained in step S133, and step S134 is executed in which the master cylinder pressure PM and the vehicle deceleration rate GB are read out. Then, step S135 is implemented to increment the count T1 of the first timer 124. Step S135 is followed by step S136 to determine whether the count T1 is equal to or larger than a reference time Tk, or not. Since a negative decision is initially obtained in step S136, the control flow returns to the main control routine. When the time Tk has elapsed after the start of the brake application, an affirmative decision is obtained in step S136, and step S137 is executed to determine whether the START flag 198 is in the set state or not. Since this flag 198 has been reset in the initialization step S101 of the main control routine of FIG. 25, a negative decision (NO) is obtained in the first execution of step S137, and step S138 is implemented to determine whether the master cylinder pressure PM is equal to or higher than a first reference value PMK1. Where the brake pedal 12 was abruptly depressed for an emergency brake, for example, for avoiding a collision of the vehicle with another vehicle or a pedestrian, the master cylinder pressure PM is usually elevated at a considerably high rate, and exceeds the first reference value PMK1 in a short time. Therefore, if the master cylinder pressure PM is equal to or higher than the first reference value PMK1, this indicates that the relevant brake was applied for an emergency purpose. Accordingly, step S138 is followed by step S143 to set the F3 flag 132 to avoid the execution of an anti-rock-back brake control operation. The control flow then goes back to the main control routine.

If the master cylinder pressure PM is lower than the first reference value PMK1 and a negative decision (NO) is obtained in step S138, step S139 is executed to determine whether the vehicle deceleration rate GB is qual to or higher than a first reference value GBK1. If the brake pedal 10 is abruptly depressed and the pressure PM in the master cylinder 12 is accordingly increased, the vehicle deceleration rate GB is also increased. Since the master cylinder pressure PM does not accurately correspond to the vehicle deceleration rate GB, both the master cylinder pressure PM and the vehicle deceleration rate GB are compared with the respective reference values, in order to detect an emergency brake application as soon as possible. If the vehicle deceleration rate GB is equal to or higher than the first reference value GBK1, this means an emergency brake, an affirmative decision (YES) is made in step S139, whereby step S143 is executed to set the F3 flag 132. The control flow then goes back to the main control routine.

If an emergency brake is detected neither in step S138 nor in step S139, step S140 is executed in which the START flag 198 is set. Consequently, when step S137 is executed in the next control cycle, an affirmative decision (YES) is obtained, and steps S138–S140 are skipped. Namely, determinations of the emergency brake in steps S138 and S139 are effected only once, during an initial period after the start of the brake application in which the master cylinder pressure PM and the vehicle deceleration rate GB are rapidly increased.

If an affirmative decision is obtained in step S137, the control flow goes to step S141 to determine whether the master cylinder pressure PM is equal to or higher than a second reference value PMK2. If an emergency abrupt operation of the brake pedal 12 takes place a relatively long time after the initial activation of the pedal 12, the master cylinder pressure PM will not exceed the first reference value PMK1 in an initial period of the brake application. In this case, the emergency braking action is not detected in steps S138 and S139, but the master cylinder pressure PM may highly possibly exceed a second reference value PMK2 which is higher than the first reference value PMK1. In view of this tendency, step S141 is executed to detect such an emergency brake, by checking to see if the master cylinder pressure PM has been raised to the second reference value PMK2. If an affirmative decision is obtained in this step S141, the control flow goes to step S143 to set the F3 flag 132, and then returns to the main control routine. If a negative decision is made in step S141, step S142 is executed to determine, based on the vehicle deceleration rate GB, whether an emergency brake was applied. Namely, both the master cylinder pressure PM and the vehicle deceleration rate GB are compared with the respective second reference values PMK2 and GBK2, in order to detect an emergency braking action at an early point of time, where the emergency brake is applied a relatively long time after the start of a normal braking operation.

If the vehicle deceleration rate GB is equal to or higher than the second reference value GBK2, an affirmative decision is made in step S142, whereby an emergency braking action is detected. In this case, the control flow goes to step S143 to set the F3 flag 132, and returns to the main control routine. If a negative decision is obtained in step S142, it is determined that no emergency braking action is present, and the control flow goes back to the main control routine. Thereafter, the determination of the braking conditions will be repeated, until an anti-lock brake control operation is initiated, or until an emergency brake application is detected.

If the vehicle speed V1 is lowered to 10 km/h without an anti-lock brake control operation, the control flow goes to step S121. If an emergency brake application is detected in step S125 of FIG. 27 (i.e., during execution of the braking condition determination routine of FIG. 28), a negative decision (NO) is obtained in step S121, and the control flow returns to the main control routine. In this case, an anti-rock-back brake control operation is not effected in step S122. If an emergency brake application is not detected, an affirmative decision (YES) is obtained in step S121, and an anti-rock-back brake control routine is executed in step S122.

The anti-rock-back brake control operation in step S122 of FIG. 27 will be described in detail, by reference to the flow chart of FIG. 29. Initially, the control flow goes to step S151 to determine wheterh the F4 flag 196 is in the set state or not. Since the F4 flag 196 is initially reset, a negative decision (NO) is obtained in step S151, and step S152 is implemented to read out the vehicle speed V1. Then, the control flow goes to step 153 to determine whether the vehicle speed V1 is equal to or lower than 5 km/h, or not. A negative decision (NO) is initially obtained in step S153, and step S154 is executed to increment the count T2 of the second timer 126. The control flow then returns to the main control routine. Thereafter, steps S111–S113, S120, S121 and S151–S154 are repeatedly executed, until an affirmative decision (YES) is obtained in step S153. Thus, the time lapse from the moment when the vehicle speed V1 is lowered to 10 km/h, to the moment when the vehicle speed is lowered to 5 km/h, is measured as the count T2 of the second timer 126.

When the vehicle speed V1 is lowered down to 5 km/h, the control flow goes to step S155 in which the pressure-decrease time TA (precisely, the count of the timer corresponding to the pressure-decrease time) is calculated by dividing a predetermined constant K by the count T2/. This constant K is determined as described above with respect to the preceding embodiments. As a result, the pressure-decrease time TA is determined depending upon the deceleration rate of the vehicle, so that the anti-rock-back brake control operation is carried out so as to lower the braking pressure in the left front wheel cylinder 20, with a predetermined braking distance and with a minimum rock-back motion of the vehicle driver/passenger.

Then, the control flow goes to step S156 to set the F4 flag 196, and step S157 in which a count T3 of the third timer 194 is incremented. Then, step S158 is executed to determine whether the count T3 is equal to or larger than the pressure-decrease time TA. Since a negative decision (NO) is initially obtained in step S158, step S159 is performed to switch the pressure control valve 18 to its pressure-decrease position. Then, the control flow returns to the main control routine. When step S151 is executed in the next control cycle, an affirmative decision (YES) is obtained, and the control flow goes to step S157, skipping steps S152–S156. When the predetermined pressure-decrease time TA has elapsed, without the brake pedal 12 released, an affirmative decision is obtained in step S158. That is, the pressure-control valve 18 is kept in the pressure-decreased position for the pressure-decrase time TA, and the wheel cylinder pressure is lowered for the same time duration TA.

Consequently, the control flow goes to step S160 to determine whether the count T3 is equal to or larger than a predetermined time TB, which is a pressure-hold time which follows the pressure-decrease time TA and which precedes the moment when the wheel cylinder pressure is raised. Namely, the pressure control valve 18 is held in the pressure-hold position for the pressure-hold time TB. This time TB is constant irrespective of the deceleration rate of the vehicle before the vehicle speed V1 is lowered to 5 km/h. In an initial period of the anti-rock-back brake control operation, a negative decision (NO) is obtained in step S160, and step S161 is executed to switch the pressure control valve 18 in the pressure-hold position, as indicated above. Then, the control flow goes back to the main control routine. Thereafter, steps S111–S113, S120, S121, S151 and S157–S161 are repeatedly executed, until an affirmative decision is obtained in step S160. When the predetermined pressure-hold time TB has passed, an affirmative decision is obtained in step S160, and the control flow goes to step S162 in which the pressure control valve 18 is switched to the pressure-increase position. The flow then returns to the main control routine.

It follows from the above description that the wheel speed sensors 84, 88, 90 and computer 180 constitute means for detecting the vehicle speed V1, while the F4 flag 196, second and third timers 126, 194, and portions of the ROM 184 and CPU 182 assigned to execute steps S151–S162 constitute stop control means for effecting an anti-rock-back brake control operation as described above by reference to FIG. 29. Further, the master cylinder pressure sensor 140, steering angle sensor 172, and the portions of the ROM 184 and CPU 182 assigned to execute steps S131–S143 constitute means for determining that the braking system is activated for an emergency purpose. The F3 flag 132, and the portions of the ROM 184 and CPU 182 assigned to execute steps S121 constitute means for inhibiting an anti-rock-back brake control operation illustrated in FIG. 29, if the braking system is activated for any emergency purpose.

In the present embodiment, each of the master cylinder pressure PM and the vehicle deceleration rate GB is compared with the first and second reference values, in the braking condition determination routine of FIG. 28. However, these parameters PM and GB may be compared with only one reference value. In this case, steps S137 and S140–S142, or steps S137–S140 are omitted.

Figure 30:
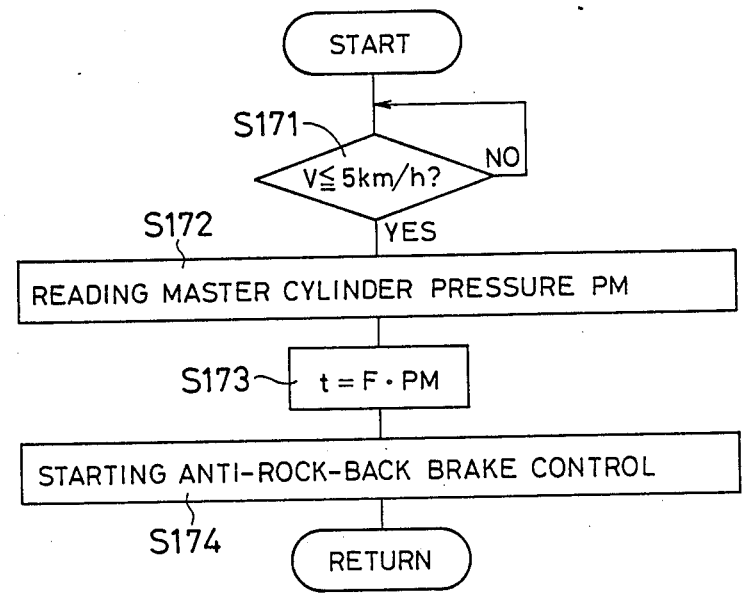
FIG. 30 is a flow chart showing a further embodiment of the invention.

In the first embodiment of FIGS. 1–8, the pressure-decrease time is determined by the vehicle deceleration rate detected prior to starting an anti-rock-back brake control operation, based on the fact that the wheel cylinder pressure is almost proportional to the deceleration rate. However, the pressure decrease time may be determined by directly detecting the wheel cylinder pressure or master cylinder pressure. For instance, the anti-rock-back control of FIG. 6 may be replaced by a routine as indicated in FIG. 30, wherein a master cylinder pressure sensor 140 is used as indicated in two-dot chain line in FIGS. 1 and 2, to directly measure the pressure PM in the master cylinder 10, which almost represents the wheel cylinder pressure. Namely, step S171 is executed to determine whether the vehicle speed has been lowered down to 5 km/h. When the vehicle speed has been lowered to this reference value, step S171 is followed by step S172 in which the master cylinder pressure PM detected by the sensor 140 is read. In the next step S172, the pressure decrease time t is calculated by multiplying the master cylinder pressure Pm by a predetermined constant F. The control flow then goes to step S174 to perform an anti-rock-back brake control operation, by holding the solenoid-operated pressure control valve (18, 19, 24) in the pressure-decrease position, for the calculated pressure decrease time t.

While the anti-lock brake device used in the above-described embodiments is a closed-circuit type, the principle of the present invention may be applied to an anti-lock brake device of a variable-volume type. Further, the present invention may be embodied as a braking system which is capable of effecting a traction control operation wherein brake is applied to prevent a slip of each drive wheel when the drive wheels are accelerated, for example, upon starting of the vehicle.

Where the variable-volume type anti-lock brake device is used, a control piston is provided such that the control piston is slidably moved by a fluid pressure which is delivered by a pressure source separate from the master cylinder. An axial movement of the control piston regulates the volume of a fluid chamber which communicates with the wheel cylinder, and thereby controls the pressure in the wheel cylinder. In this case, too, it may be considered that the braking pressure is supplied to the wheel cylinder from the pressure source. Where the third embodiment of FIG. 10 is modified to use the variable-volume type anti-lock brake device, the flow restrictor valves 104, 108 may be provided in passages between the fluid chamber and the pressure source which communicate with the control pistion.

While the present invention has been described in its presently preferred embodiments with a certain degree of particularity, it is to be understood that the invention is not limited to the details of the illustrated embodiments or modifications thereof described above, and the invention may be embodied with various other changes, modifications and improvements, which may occur to those skilled in the art, without departing from the spirit and scope of the invention defined in the following claims.

What is claimed is:

1. A braking system for a motor vehicle, comprising:
   a hydraulically operated brake device having a brake operating member, and wheel cylinders provided on wheels of the vehicle for braking the wheels with braking pressures corresponding to an operation of the brake operating member;
   vehicle speed detecting means for detecting a running speed of the vehicle;
   stop control means for effecting an anti-rock-back operation to lower said braking pressures of said wheel cylinders when the detected running speed of the vehicle falls below a predetermined reference value, and thereby reducing an amount of rock-back of a driver and a passenger of the vehicle upon stopping of the vehicle;
   slope determining means for effecting determination as to whether a road on which the vehicle is running is a level road, an uphill or a downhill; and
   pressure-decrease pattern determining means for determining a pressure-decrease pattern in which said braking pressures of said wheel cylinders are lowered by said stop control means, according to a result of said determination by said slope determining means.

2. A braking system according to claim 1, wherein said slope determining means includes:
   pressure detecting means for detecting said braking pressures of said wheel cylinders;
   deceleration detecting means for detecting a deceleration rate of the vehicle, without an incluence by an inclination of the vehicle in a plane parallel to a running direction of the vehicle; and
   judging means for determining the slope of said road, by comparing the deceleration rate of the vehicle detected by said deceleration detecting means, with a predetermined deceleration rate of the vehicle which is to be established with the braking pressures of said wheel cylinders detected by said pressure detecting means, during running of the vehicle on said level road.

3. A braking system according to claim 1, wherein said slope determining means includes:

first deceleration detecting means for detecting a first deceleration rate of the vehicle, without an influence by an inclination of the vehicle in a plane parallel to a running direction of the vehicle;

second deceleration detecting means for detecting a second deceleration rate of the vehicle, based on an inertia produced by a suspended weight; and judging means for determining the slope of said road by comparing said first and second deceleration rates with each other.

4. A braking system according to claim 1, wherein said stop control means includes pressure-decrease control means for lowering said braking pressures of said wheel cylinders, in a plurality of steps during said anti-rock-back operation, and said pressure-decrease pattern determining means includes decrease-time determining means for determining a time duration for which said braking pressures are lowered in each of said plurality of steps, said decrease-time determining means determining said time duration such that said time duration for said uphill road is shorter than that for said level road, while said time duration for said downhill road is longer than that for said level road.

5. A braking system according to claim 1, further comprising pressure-increase means for raising said braking pressures of said wheel cylinders after said stop control means has terminated said anti-rock-back operation, and control-time determining means for determining a length of time of said anti-rock-back operation such that said length of time for said uphill road and said downhill road is shorter than that for said level road.

6. A braking system according to claim 1, further comprising a deceleration detecting means for detecting a deceleration rate of the vehicle, and wherein said stop control means includes pressure-decrease control means for lowering said braking pressures of said wheel cylinders, in a plurality of steps during said anti-rock-back operation, and said pressure-decrease pattern determining means includes decrease-time determining means for determining a time duration for which said braking pressures are lowered in each of said plurality of steps, said decrease-time determining means determining said time duration such that said time duration decreases with a decrease in the detected deceration rate of the vehicle before said anti-rock-back operation is started by said pressure-decrease control means.

7. A braking system according to claim 1, wherein said stop control means includes pressure-decrease control means for lowering said braking pressures of said wheel cylinders, in a plurality of steps during said anti-rock-back operation, and said pressure-decrease pattern determining means includes reference vehicle speed determining means for determining a reference vehicle speed at which said pressure-decrease control means starts said anti-rock-back operation, said reference vehicle speed determining means determining said reference vehicle speed such that said reference vehicle speed decreases with a decrease in a deceration rate of the vehicle before said anti-rock-back operation is started by said pressure-decrease control means.

8. A braking system according to claim 1, wherein said said stop control means includes;

a solenoid-operated pressure control valve device adapted to achieve a primary control operation which consists of at least one of an anti-lock operation to prevent an excessive amount of slip of said wheels of the vehicle during brake application by said hydraulically operated brake device, a traction control operation to prevent an excessive amount of slip of said wheels during acceleration of the vehicle, and a braking effect control operation to provide a braking effect which is predetermined depending upon an operation of said brake operating member, said pressure control valve being operable between a pressure-increase position for feeding a brake fluid into said wheel cylinders to increase said braking pressures, and a pressure-decrease position for discharging the brake fluid from said wheel cylinders to decrease said braking pressures;

a solenoid-operated flow restrictor device disposed in a fluid passage through which the brake fluid is discharged from said wheel cylinders, with said pressure control valve device placed in said pressure-decrease position, said flow restirctor device being operable between an operated position in which a discharge flow of the brake fluid from said wheel cylinders is restricted to a value lower than that during said primary control operation of said solenoid-operated pressure control valve device, and a non-operated position in which said discharge flow is not restricted; and changeover means for operating said solenoid-operated pressure control valve device to said pressure-decrease position, and operating said solenoid-operated flow restrictor device to said operated position, when said stop control means is activated to start said anti-rock-back operation.

9. A braking system according to claim 1, further comprising braking condition determining means for determining whether said hydraulically operated brake device is activated for a normal braking operation, or for an emergency braking operation; and inhibiting means for inhibiting said stop control means from operating to effect said anti-rock-back operation, if said braking condition determining means determines that the brake device has been activated for said emergency braking operation.

10. A braking system for a motor vehicle, comprising:

a hydraulically operated brake device having a brake operating member, and wheel cylinders provided on wheels of the vehicle for braking the wheels with braking pressures corresponding to an operation of the brake operating member;

vehicle speed detecting means for detecting a running speed of the vehicle;

deceleration detecting means for detecting a deceleration rate of the vehicle;

pressure-decrease control means for effecting an anti-rock-back operation to lower said braking pressures of said wheel cylinders, in a plurality of steps, for a controlled time duration for each of said steps, when the detected running speed of the vehicle falls below a predetermined reference value; and decrease-time determining means for determining said controlled time duration such that said time duration decreases with a decrease in the detected deceleration of the vehicle before said anti-rock-back operation is started by said pressure-decrease control means.

11. A braking system according to claim 10, wherein said decrease-time determining means determines said controlled time duration by dividing a predetermined constant by a time period necessary for said running speed of the vehicle to be lowered to said reference value from a value which is higher than the reference value by a predetermined amount.

12. A braking system according to claim 10, wherein said pressure-decrease control means includes pressure-holding means for holding the braking pressures of the wheel cylinders after said braking pressures have been lowered in said plurality of steps.

13. A braking system for a motor vehicle, comprising:
a hydraulically operated brake device having a brake operating member, and wheel cylinders provided on wheels of the vehicle for braking the wheels with braking pressures corresponding to an operation of the brake operating member;
vehicle speed detecting means for detecting a running speed of the vehicle;
deceleration detecting means for detecting a deceleration rate of the vehicle;
pressure-decrease control means for effecting an anti-rock-back operation to lower said braking pressures of said wheel cylinders in a plurality of steps, when the detected running speed of the vehicle falls below a controlled reference value; and
reference vehicle speed determining means for determining said controlled reference value of said running speed of the vehicle such that said reference value decreases with a decrease in the deceleration rate of the vehicle detected by said deceleration detecting means before said anti-rock-back operation is started by said pressure-decrease control means.

14. A braking system for a motor vehicle, comprising:
a hydraulically operated brake device having a brake operating member, and wheel cylinders provided on wheels of the vehicle for braking the wheels with braking pressures corresponding an operation of the brake operating member;
vehicle speed detecting means for detecting a running speed of the vehicle;
a solenoid-operated pressure control valve device adapted to achieve a primary control operation which consists of at least one of an anti-lock operation to prevent an excessive amount of slip of said wheels of the vehicle during brake application by said hydraulically operated brake device, a traction control operation to prevent an excessive amount of slip of said wheels during acceleration of the vehicle, and a braking effect control operation to provide a braking effect which is predetermined depending upon an operation of said brake operating member, said pressure control valve device being operable between a pressure-increase position for feeding a brake fluid into said wheel cylinders to increase said braking pressures, and a pressure-decrease position for discharging the brake fluid from said wheel cylinders to decrease said braking pressures;
a solenoid-operated flow restrictor device disposed in a fluid passage through which the brake fluid is discharged from said wheel cylinders, with said pressure control valve device placed in said pressure-decrease position, said flow restrictor device being operable between an operated position in which a discharge flow of the brake fluid from said wheel cylinders is restricted to a value lower than that during said primary control operation of said solenoid-operated pressure control valve, and a non-operated position in which said discharge flow is not restricted; and
changeover means for operating said solenoid-operated pressure control valve to said pressure-decrease position, and operating said solenoid-operated flow restrictor device to said operated position, when the detected running speed of the vehicle falls below a predetermined reference value, whereby said braking pressures of said wheel cylinders are lowered to reduce an amount of rock-back of a driver and a passenger of the vehicle upon stopping of the vehicle.

15. A braking system for a motor vehicle, comprising:
a hydraulically operated brake device having a brake operating member, and wheel cylinders provided on wheels of the vehicle for braking the wheels with braking pressures corresponding an operation of the brake operating member;
vehicle speed detecting means for detecting a running speed of the vehicle;
stop control means for effecting an anti-rock-back operation to lower said braking pressures of said wheel cylinders when the detected running speed of the vehicle falls below a predetermined reference value, and thereby reducing an amount of rock-back of a driver and a passenger of the vehicle upon stopping of the vehicle;
braking condition determining means for determining whether said hydraulically operated brake device is activated for a normal braking operation, or for an emergency braking operation; and
inhibiting means for inhibiting said stop control means from operating to effect said anti-rock-back operation, if said braking condition determining means determines that the brake device has been activated for said emergency braking operation.

16. A braking system according to claim 15, wherein said braking condition determining means determines that said brake device has been activated for said emergency braking operation, if at least one of the following parameters exceeds a corresponding reference value: an acceleration rate in a transverse direction of the vehicle during activation of said brake device; a rate of increase in said braking pressures of said wheel cylinders in an initial period of activation of said brake device; a rate of increase in a deceleration rate of the vehicle during said initial period of activation of the brake device; said braking pressures of said wheel cylinders; and said deceleration rate of the vehicle.

17. A braking system for a motor vehicle, comprising:
a hydraulically operated brake device having a brake operating member, and wheel cylinders provided on wheels of the vehicle for braking the wheels with braking pressures corresponding an operation of the brake operating member;
vehicle speed detecting means for detecting a running speed of the vehicle;
pressure detecting means for detecting said braking pressures of said wheel cylinders;
pressure-decrease control means for effecting an anti-rock-back operation to lower said braking pressures of said wheel cylinders, in a plurality of steps, for a controlled time duration for each of said plurality of steps, when the detected running speed of the vehicle falls below a predetermined reference value; and
decrease-time determining means for determining said controlled time duration such that said time duration increases with an increase in said braking pressures detected by said pressure detecting means before said anti-rock-back operation is started by said pressure-decrease control means.

* * * * *